(12) United States Patent
Vestal

(10) Patent No.: US 10,620,904 B2
(45) Date of Patent: Apr. 14, 2020

(54) NETWORK BROADCASTING FOR SELECTIVE PRESENTATION OF AUDIO CONTENT

(71) Applicant: AT&T Intellectual Property I, L.P., Atlanta, GA (US)

(72) Inventor: Christopher Daniel Vestal, Durham, NC (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/128,559

(22) Filed: Sep. 12, 2018

(65) Prior Publication Data

US 2020/0081682 A1 Mar. 12, 2020

(51) Int. Cl.
| | |
|---|---|
| *G06F 3/16* | (2006.01) |
| *H04L 29/06* | (2006.01) |
| *G10L 19/008* | (2013.01) |
| *G06F 3/0482* | (2013.01) |
| *G06F 3/0484* | (2013.01) |

(52) U.S. Cl.
CPC ............ *G06F 3/165* (2013.01); *G06F 3/0482* (2013.01); *G06F 3/04847* (2013.01); *G06F 3/167* (2013.01); *G10L 19/008* (2013.01); *H04L 29/06496* (2013.01); *H04L 29/06517* (2013.01)

(58) Field of Classification Search
CPC ..... G06F 3/165; H04L 65/601; H04L 65/602; H04L 65/604
USPC .......................................................... 700/94
See application file for complete search history.

(56) References Cited

U.S. PATENT DOCUMENTS

| | | | |
|---|---|---|---|
| 7,483,532 B2 | 1/2009 | Alkove et al. | |
| 7,602,769 B2 | 10/2009 | Lee | |
| 9,282,420 B2 | 3/2016 | Leitch | |
| 9,640,163 B2 | 5/2017 | Fejzo et al. | |
| 9,699,584 B2 | 7/2017 | Disch et al. | |
| 2011/0202967 A1* | 8/2011 | Hecht | G11B 27/034 725/114 |
| 2012/0311090 A1 | 12/2012 | Locker et al. | |
| 2014/0092783 A1* | 4/2014 | Pulicherla | H04L 12/6418 370/260 |
| 2014/0369528 A1 | 12/2014 | Ellner | |
| 2017/0111408 A1 | 4/2017 | Blake | |
| 2017/0272883 A1 | 9/2017 | Disch et al. | |

* cited by examiner

*Primary Examiner* — Walter F Briney, III
(74) *Attorney, Agent, or Firm* — Hartman & Citrin LLC

(57) ABSTRACT

Concepts and technologies directed to network broadcasting for selective presentation of audio content are disclosed herein. Embodiments can include a system having a memory and a processor that is configured to perform operations. The operations can include obtaining a plurality of raw audio streams created by a plurality of audio capture devices, where each of the plurality of raw audio streams captures audio output from an audio source of a plurality of audio sources. The operations can include creating a packetized audio data set for each of the plurality of raw audio streams to create a plurality of packetized audio data sets. The operations can include binding each audio source from the plurality of audio sources to one of the plurality of packetized audio data sets via a plurality of audio isolation tags such that execution of each packetized audio data set can be individually initiated and suppressed.

20 Claims, 7 Drawing Sheets

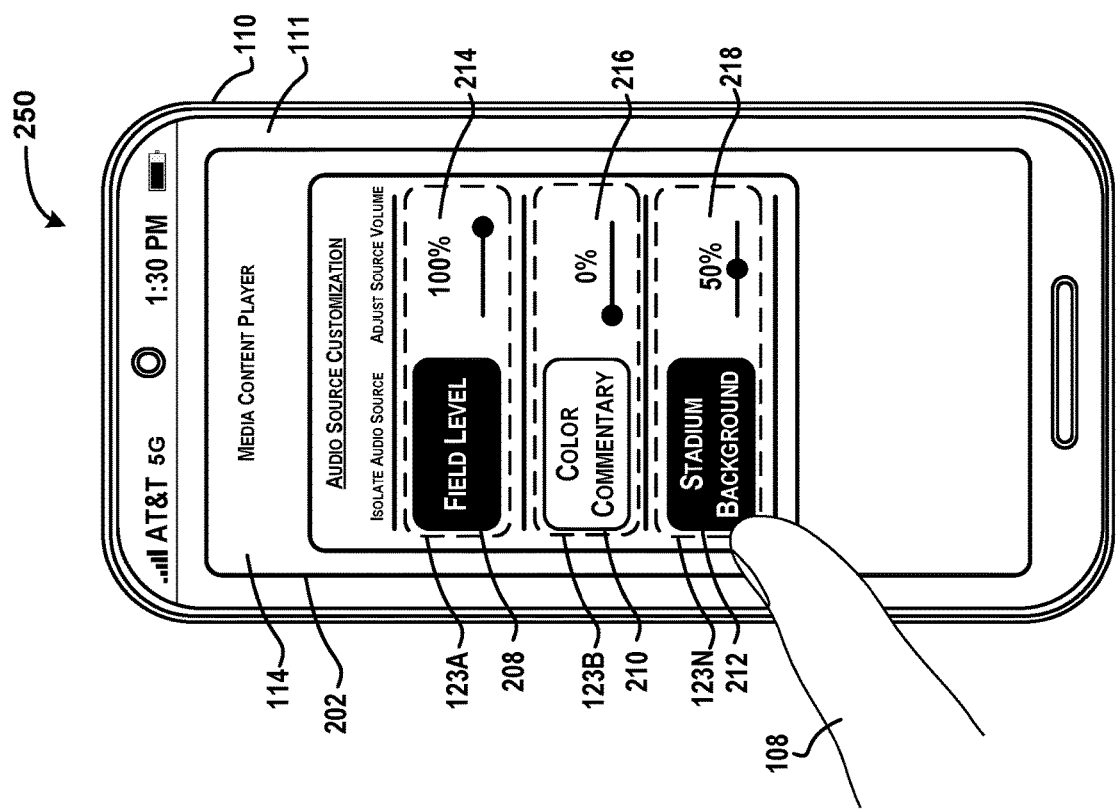
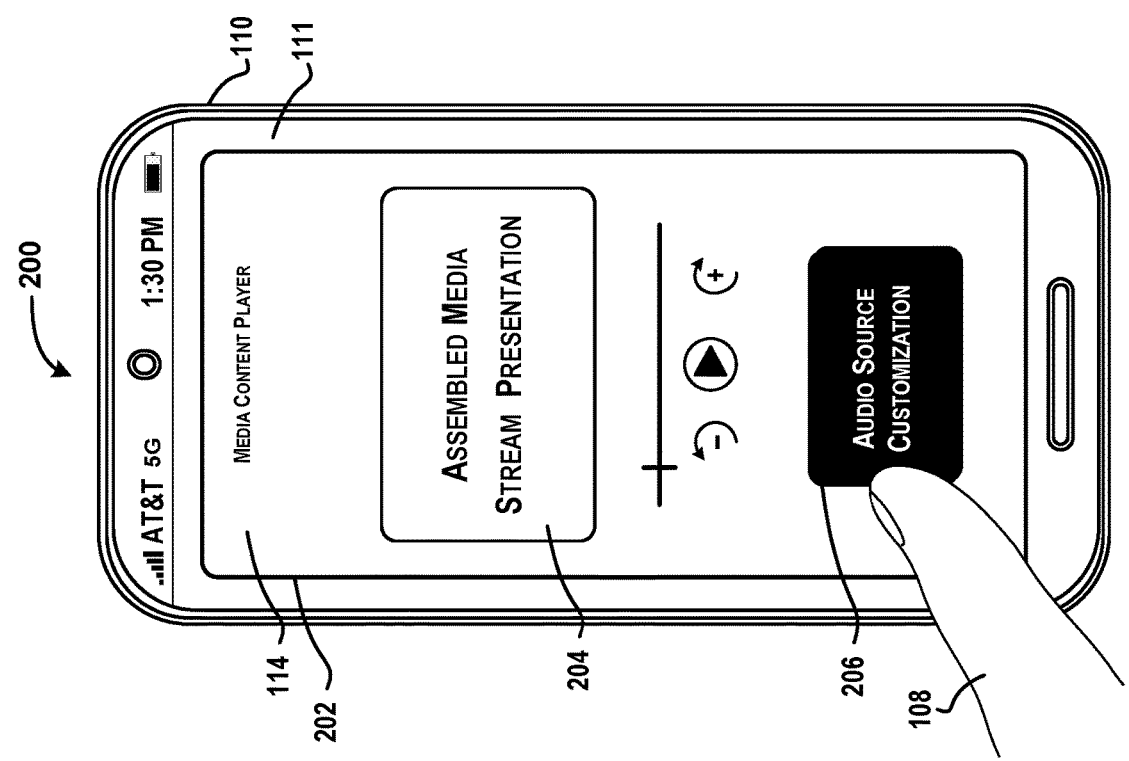
FIG. 2B
FIG. 2A

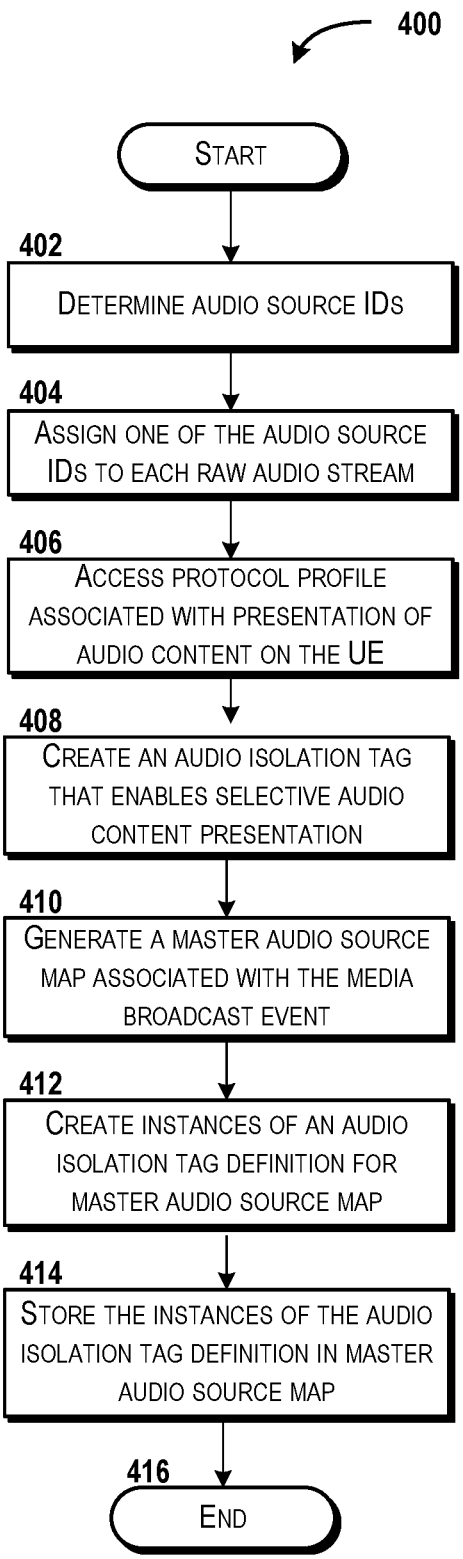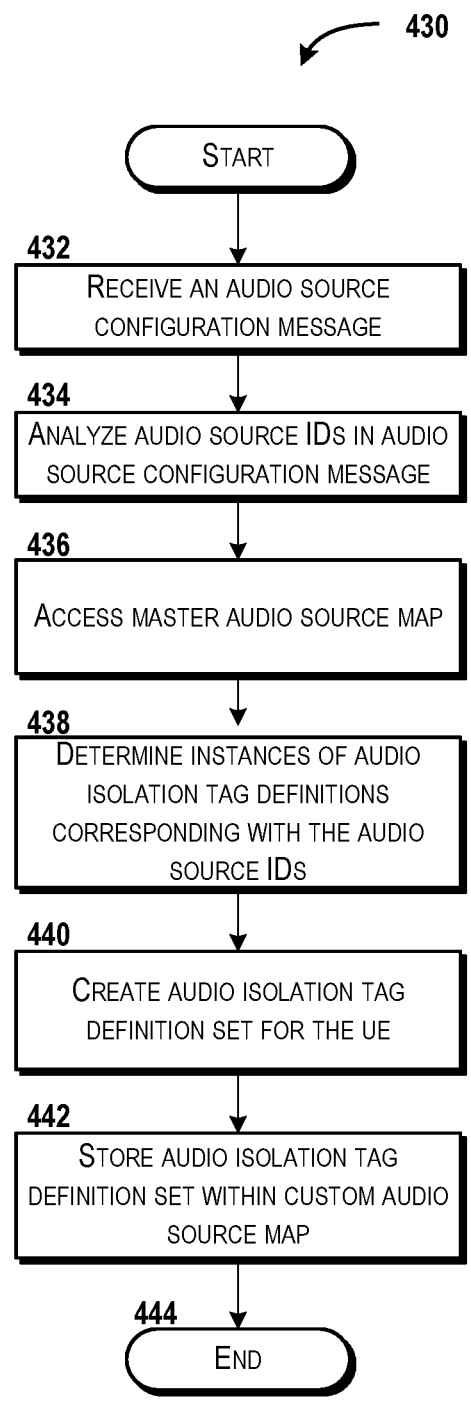
FIG. 4A
FIG. 4B

NETWORK BROADCASTING FOR SELECTIVE PRESENTATION OF AUDIO CONTENT

BACKGROUND

Historically, real-time transmission of video and/or audio content was provided through analog broadcasts. More recently, communication service providers facilitate access to one or more communications network that allow for media content (e.g., video and/or audio content) to be broadcast, transmitted, or otherwise provided in a digital format. Because of market economics, there may be multiple actors involved in creating the media content, storing the media content in network-accessible memory, hosting a network service to distribute the media content to various endpoints, and supporting access to a network communication service provider. Therefore, a customer may subscribe to a network service provided by a communication service provider, which in turn facilitates the presentation of media content that was produced by a third-party content creator that captured the video and/or audio from a media event. For example, conventionally, professional sporting events (e.g., professional baseball, rugby, golf, hockey, football, soccer, etc.) may be captured via multiple audio and/or video capture devices, which are combined into a single media stream and sent to a customer's user equipment (e.g., a television). However, these conventional mechanisms force the customer to watch and/or listen to the media event according to the static configuration provided by the content creator. Therefore, although the customer may be able to change the language of the audio being presented and/or change whether multi-channel audio playback (e.g., stereo sound in 2.1 channels or surround sound in 5.1 channels, 7.1 channels. etc.) is active, the conventional systems force the customer to view and/or listen to whatever visual image and/or audio output is provided by the conventional media stream. In addition to causing consumer frustration, this may increase computing hardware utilization on the user equipment through forced processing of data from the conventional media stream.

SUMMARY

The present disclosure is directed to network broadcasting for selective presentation of audio content, according to various embodiments. As used herein, the phrase "audio content" refers to executable instances of data that are configured to present audio output on a user equipment. According to one aspect of the concepts and technologies disclosed herein, a system is disclosed. In some embodiments, the system can include a processor and a memory. In some embodiments, the processor and the memory can be provided by components of a device hosted on a network. The memory can store computer-executable instructions that, when executed by the processor, cause the processor to perform operations. In some embodiments, the operations can include obtaining a plurality of raw audio streams created by a plurality of audio capture devices, where each of the plurality of raw audio streams captures audio output from an audio source of a plurality of audio sources. The operations can include creating a packetized audio data set for each of the plurality of raw audio streams such that a plurality of packetized audio data sets are created. The operations can include binding each audio source from the plurality of audio sources to one of the plurality of packetized audio data sets via a plurality of audio isolation tags such that execution of each packetized audio data set can be individually initiated and individually suppressed.

In some embodiments, the operations can include creating an assembled media stream that includes the plurality of packetized audio data sets. The operations can include providing the assembled media stream to a user equipment. In some embodiments, the operations can include generating a master audio source map that includes the plurality of audio isolation tags that bind the plurality of packetized audio data sets to the plurality of audio sources. The operations can include providing the master audio source map to a digital headend system. In some embodiments, the operations can include generating an audio source selection interface package that instructs the user equipment to present an audio source customization interface. The audio source customization interface can be configured to generate an audio source configuration message in response to input from a user. The operations also can include providing the audio source selection interface package to the user equipment. The operations also can include receiving an audio source configuration message from the user equipment, where the audio source configuration message identifies one or more of the plurality of audio sources based on input from a user. In some embodiments, the operations can include generating a custom audio source map for the user equipment based on the audio source configuration message. The operations can include providing the custom audio source map to the user equipment. The custom audio source map can configure the user equipment to present audio output corresponding to the one or more of the plurality of audio sources identified in the audio source configuration message.

According to another aspect of the concepts and technologies disclosed herein, a method is disclosed. The method can include obtaining, by a system executing within a network, a plurality of raw audio streams created by a plurality of audio capture devices, where each of the plurality of raw audio streams captures audio output from an audio source of a plurality of audio sources. The method can include creating, by the system, a packetized audio data set for each of the plurality of raw audio streams such that a plurality of packetized audio data sets are created. The method can include binding, by the system, each audio source from the plurality of audio sources to one of the plurality of packetized audio data sets via a plurality of audio isolation tags such that execution of each packetized audio data set can be individually initiated and individually suppressed. In some embodiments, the method can include creating, by the system, an assembled media stream that includes the plurality of packetized audio data sets. The method can include providing, by the system, the assembled media stream to a user equipment.

In some embodiments, the method can include generating, by the system, a master audio source map that includes the plurality of audio isolation tags that bind the plurality of packetized audio data sets to the plurality of audio sources. The method can include providing, by the system, the master audio source map to a digital headend system. In some embodiments, the method can include generating, by the system, an audio source selection interface package that instructs the user equipment to present an audio source customization interface. The audio source customization interface can be configured to generate an audio source configuration message in response to input from a user. The method also can include providing, by the system, the audio source selection interface package to the user equipment. The method also can include receiving, by the system, an audio source configuration message from the user equipment, where the audio source configuration message identifies one or more of the plurality of audio sources based on input from a user. In some embodiments, the method can include generating, by the system, a custom audio source map for the user equipment based on the audio source configuration message. The method can include providing, by the system, the custom audio source map to the user equipment. The custom audio source map can configure the user equipment to present audio output corresponding to the one or more of the plurality of audio sources identified in the audio source configuration message.

According to yet another aspect, a computer storage medium is disclosed. The computer storage medium can have computer-executable instructions stored thereon. When the computer-executable instructions are executed by a processor, the processor can perform operations. In some embodiments, the processor can be included in a computer system, such as a network server that can communicatively couple with a network. In some embodiments, the operations can include obtaining a plurality of raw audio streams created by a plurality of audio capture devices, where each of the plurality of raw audio streams captures audio output from an audio source of a plurality of audio sources. The operations can include creating a packetized audio data set for each of the plurality of raw audio streams such that a plurality of packetized audio data sets are created. The operations can include binding each audio source from the plurality of audio sources to one of the plurality of packetized audio data sets via a plurality of audio isolation tags such that execution of each packetized audio data set can be individually initiated and individually suppressed.

In some embodiments, the operations can include creating an assembled media stream that includes the plurality of packetized audio data sets. The operations can include providing the assembled media stream to a user equipment. In some embodiments, the operations can include generating a master audio source map that includes the plurality of audio isolation tags that bind the plurality of packetized audio data sets to the plurality of audio sources. The operations can include providing the master audio source map to a digital headend system. In some embodiments, the operations can include generating an audio source selection interface package that instructs the user equipment to present an audio source customization interface. The audio source customization interface can be configured to generate an audio source configuration message in response to input from a user. The operations also can include providing the audio source selection interface package to the user equipment. The operations also can include receiving an audio source configuration message from the user equipment, where the audio source configuration message identifies one or more of the plurality of audio sources based on input from a user. In some embodiments, the operations can include generating a custom audio source map for the user equipment based on the audio source configuration message. The operations can include providing the custom audio source map to the user equipment. The custom audio source map can configure the user equipment to present audio output corresponding to the one or more of the plurality of audio sources identified in the audio source configuration message.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2A is a user interface diagram showing an example screen display for enabling presentation of audio content from specific audio sources, according to an illustrative embodiment.

FIG. 2B is a user interface diagram showing another example screen display for enabling presentation of audio content from specific audio sources, according to an illustrative embodiment.

FIG. 4A is a flow diagram illustrating aspects of a method for generation of a master audio source map to support selective presentation of audio content, according to an illustrative embodiment.

FIG. 4B is a flow diagram illustrating aspects of a method for generation of a custom audio source map to support selective presentation of audio content, according to an illustrative embodiment.

DETAILED DESCRIPTION

Figure 1:
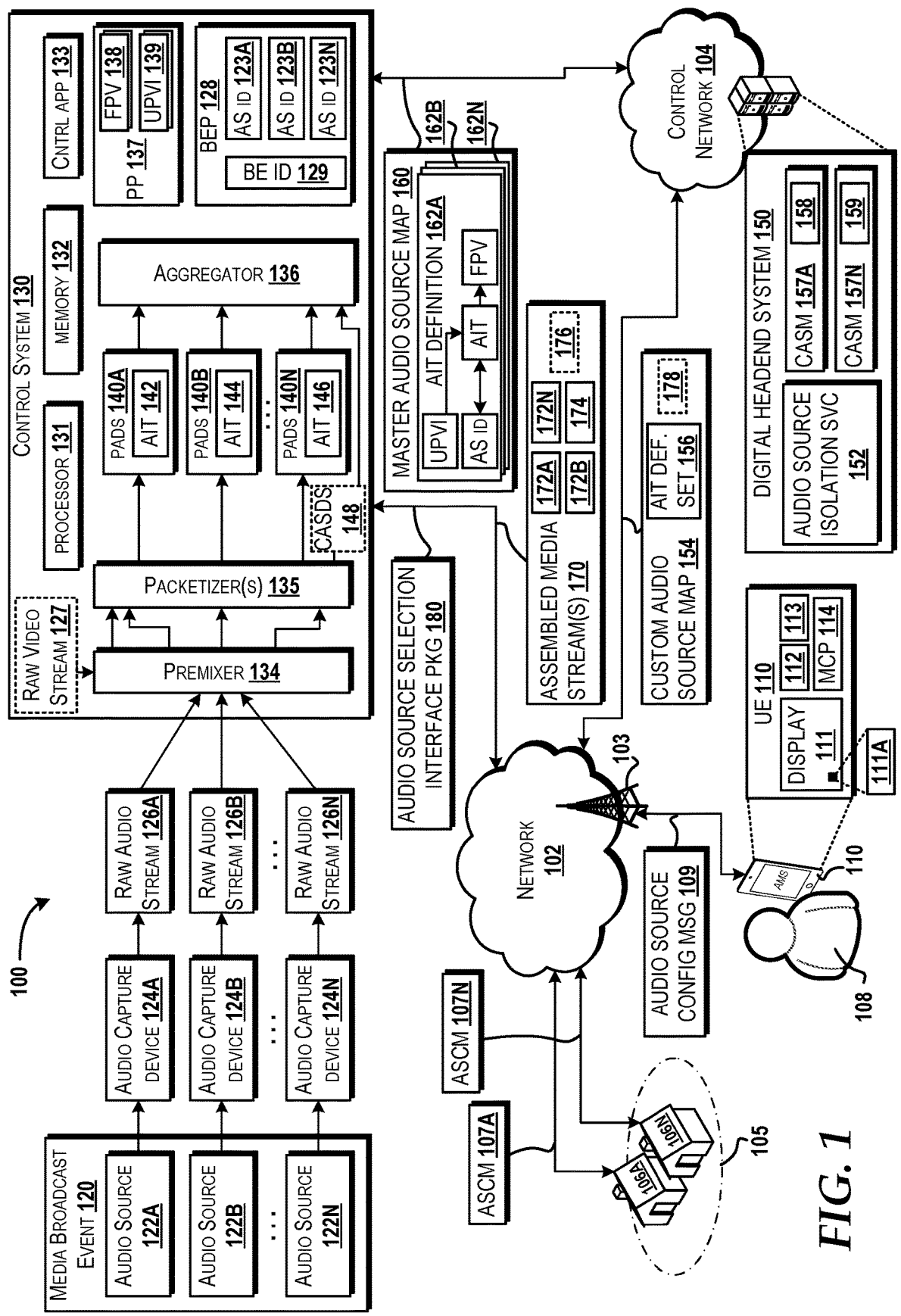
FIG. 1 is a block diagram illustrating an example operating environment of that supports network broadcasting for selective presentation of audio content, according to an illustrative embodiment.

The following detailed description is directed to network broadcasting for selective presentation of audio content, according to various embodiments. Conventional systems take audio from various audio sources and combine or otherwise mix all of the audio into a single content stream such that, upon execution by a user equipment, all of the audio content from all of the audio sources is presented. At most, an end user may be allowed to mute audio output of audio content from all audio sources and/or adjust which audio speakers are being used for playback of the audio content, but cannot control, customize, and/or select how the audio content should be presented. In some instances, audio content corresponds with a media broadcast event (e.g., a sporting event, a film series, a nightly newscast, a webcast, a podcast, a network streaming event, a video program delivered by a network service, a live video and/or audio feed, a time-delayed video and/or audio feed, an internet protocol call, etc.) that is being captured and/or broadcast in substantially real-time (i.e., being captured, packaged, configured, and sent to a user equipment with a time-delay caused by network latency, device processing, and/or a pre-defined time buffer) via a network, such as in a content stream. Because the audio content from the media broadcast event may be a delivered in substantially real-time, various mechanisms may employ an industry standard protocol by which to encode and provide data. For example, in some embodiments, a user equipment may be configured to receive a content stream that is encoded, formatted, or otherwise configured according to one or more standard protocol, such as but not limited to one or more of a Real-Time Transport Protocol ("RTP") developed by the Internet Engineering Task Force, a Real-Time Transport Protocol Control Protocol ("RTCP"), a User Datagram Protocol ("UDP"), a Transmission Control Protocol ("TCP"), a Session Initiation Protocol ("SIP"), a Session Description Protocol ("SDP"), a combination thereof, or other protocol understood by one of ordinary skill in the concepts and technology discussed herein.

Conventionally, when audio content and/or video content is provided to a user equipment using various specifications of the RTP, the conventional sending system captures the multimedia content (e.g., audio content from all audio sources and/or video content from all video sources), mixes and combines the multimedia content from all sources together into data packets, encodes the data packets according to a standard protocol profile (e.g., an RTP profile) so as to create RTP packets, and transmits the RTP packets within a single content stream that has appropriate timestamps and sequence numbers for the RTP packets. Conventionally, the sending system uses the RTP profile to set a payload type field within each RTP packet with a static or otherwise fixed protocol value from the RTP profile in use based on the type of content that is being carried by the RTP packet. For example, in conventional systems, if an RTP packet carries data corresponding to audio content from any audio source, then every RTP packet will be set with the same fixed protocol value, irrespective of the audio source to which the audio content pertains. As such, the receiving device, such as a user equipment, can receive and decode the conventional single content stream where every RTP packet carrying audio content uses the same fixed protocol value, despite the audio content potentially being from different audio sources. This is because the conventional mechanisms for network broadcasting and streaming audio content are limited to indicating a payload type (e.g., whether the data packet carries audio content or video content) using a known, fixed protocol value to set a payload type field so as to conform to the RTP profile, and in turn causes the user equipment to present all of the audio content and/or video content from the content stream to a viewing user, irrespective of whether the audio output being presented corresponds with different sources, such as separate audio sources and/or separate video sources. Therefore, conventional systems and standards do not provide mechanisms by which presentation of audio content can be distinguished between various audio sources within a content stream.

As such, concepts and technologies provided herein provide a system that enables isolation and selective execution of data packets carrying audio content corresponding to specific audio sources so as to enable selective presentation of audio output from audio sources that are selected by a viewing user. Embodiments of the present disclosure can conform to an industry standard protocol (e.g., an RTP specification) so that media content can be streamed or otherwise sent to various user equipment through a variety of communication channels, while also enabling selection and suppression of specific audio output from specific audio sources based on the generation of customized audio source mapping corresponding to the particular media broadcast event captured and carried by data packets. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, network servers, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for network aggregation of streaming data interactions from distinct user interfaces will be described, according to an illustrative embodiment. The operating environment 100 shown in FIG. 1 includes a communications network ("network") 102, a network access point 103, a control network 104, an authorized streaming location 105, a subscribing client 106A, a subscribing client 106N, a user 108, a user equipment ("UE") 110, a media broadcast event 120, an audio capture device 124A, an audio capture device 124B, an audio capture device 124N, a control system 130, and a digital headend system 150. Briefly, it should be understood that the network 102 and the control network 104 can include almost any type of computer networks as well as communications networks. In various embodiments, the network 102 and/or the control network 104 can include one or more of a radio access network, an evolved packet core network, a core network, an IP-based network, a transport network, an optical transport network, a circuit switched network, a mobile Wide Area Network, a combination thereof, or the like. It is understood that the network can communicate with one or more devices, (e.g., any of the UE 110 and/or the subscribing clients 106A and 106N) via one or more network access points (e.g., the network access point 103) that can establish, provide, and maintain wireless and/or wired communication links. In various embodiments, the control network 104 may be associated with a communication service provider that can provide a network service to customers, such as an audio source isolation service discussed herein. In the example operating environment 100 illustrated in FIG. 1, the control network 104 is shown as a separate network cloud from the network 102, however this may not necessarily be the case in every embodiment. In some embodiments, the control network 104 may correspond with a portion of the network 102, where the control network 104 includes hardware components and software components that facilitate and support communications and services provided to various devices which may or may not be associated with a communications service provider. As such, it should be understood that the examples provided are for illustration purposes only, and therefore should not be construed as limiting in any way.

In various embodiments, a network access point of the network 102 and/or the control network 104 (e.g., the network access point 103), can be communicatively coupled to network elements within the network 102, the control network 104, and/or any other computing device of the operating environment 100, such as any of the subscribing client 106A, the subscribing client 106N, the UE 110, the control system 130, the digital headend system 150, the audio capture device 124A, the audio capture device 124B, and/or the audio capture device 124N. Although only one network access point (e.g., the network access point 103) is shown in FIG. 1, the network 102 and/or the control network 104 can support multiple network access points configured the same as, or similar to, the network access point 103.

In various embodiments, the network access point 103 can provide wired and/or wireless communicative coupling and can include, but should not be limited to, one or more of a base transceiver station, a wireless router, a femtocell, an eNode B, a NodeB, a gNodeB (i.e., an access point that incorporates new radio access technology, such as LTE Advanced and other 5G technology), a multi-standard metro cell node, a customer premise edge node (e.g., an optical network terminal), and/or other network nodes or combinations thereof that are capable of providing communication to and/or from the network 102 and/or the control network 104. As illustrated in FIG. 1, the network access point 103 is configured in the form of a wireless tower that is communicatively coupled to the network 102, however it is understood that this may not be the case in all embodiments. It should be understood that the examples provided are for illustration purposes only, and therefore should not be construed as limiting in any way.

In various embodiments, at least a portion of the network 102 and/or the control network 104 can be operated, in whole or in part, by a communication service provider that enables various network services to be offered to customers, such as the user 108, via a customer's computing device, such as the UE 110. The network 102 and/or the control network 104 can host and/or be in communication with the control system 130 and/or the digital headend system 150, each of which may host or otherwise support the operation of one or more instances of network services. For example, in some embodiments, the network 102, the control network 104, the control system 130, and/or the digital headend system 150 can provide network services that include, but should not be limited to, communication services, network broadcast services via content streams, on-demand audio and/or video content services, audio-sharing and/or video-sharing services, audio source isolation services for various media content (e.g., audio content from multiple audio sources), compute services, analysis services, storage services, routing services, switching services, relay services, virtualized services, combinations thereof, and/or other virtualized or non-virtualized network services. It should be understood that, as used herein and in the claims, the term "service" should be construed as one or more executing applications or other computer-executable instructions that can provide a set of communication and/or network functions and/or operations on behalf of the network 102, the control network 104, the control system 130, and/or the digital headend system 150, and therefore the term "service" is not used, and shall not be construed or interpreted so as to invoke, pertain, or otherwise be directed to any abstract idea, any judicial exception, or other claim construction yielding a definition that could be interpreted as non-patentable subject matter. The network services can be used by a service provider, by third parties, and/or by customers via user equipment, servers, and/or other virtualized and/or non-virtualized computing systems. Further discussion of embodiments of the network 102 and the control network 104 is provided with respect to FIG. 5. It should be understood that the examples provided are for illustration purposes only, and therefore should not be construed as limiting in any way.

In some embodiments, the operating environment can include one or more instances of a subscribing client device ("subscribing client"), such as the subscribing client 106A and the subscribing client 106N. A subscribing client refers to any user equipment that can access and/or be configured by a network service provided by a communication service provider, such as an audio source isolation service 152. In various embodiments, the subscribing clients 106A, 106N may be configured as an instance of user equipment that is substantially similar to an embodiment of the UE 110. As such, the subscribing clients 106A, 106N may be able to perform operations substantially similar to the UE 110 so as to receive streaming audio content and be configured to selectively present audio content corresponding to specific audio sources based on a subscription to one or more network services, such as the audio source isolation service 152. Further discussion of an embodiment of the subscribing clients 106A, 106N is provided below with respect to FIG. 7. It should be understood that the examples provided are for illustration purposes only, and therefore should not be construed as limiting in any way.

In some embodiments, a content creator associated with a media broadcast event, such as the media broadcast event 120 discussed below, may authorize media content (e.g., audio content and/or video content) that captures the media broadcast event to be provided via a network (e.g., the network 102 and/or the control network 104) only to authorized streaming locations, such as the authorized streaming location 105. The authorized streaming location 105 can correspond with a geographical address and/or a network address that is permitted to receive one or more content streams that enable presentation of audio content and/or video content from audio sources and/or video sources of the media broadcast event, such as the media broadcast event 120. For example, the media broadcast event 120 may include a professional sporting event that is captured and provided for broadcasting through one or more instances of a content stream. Because of legal policy, technical policy, any other policy, the property rights holders associated with the media broadcast event may allow for the presentation of the event in certain authorized locations, such as the authorized streaming location 105. In some embodiments, devices which are located or otherwise associated with the authorized streaming location 105 (e.g., the subscribing clients 106A, 106N and/or the UE 110) are authorized or otherwise permitted to receive a content stream (e.g., one or more streams discussed herein) and present audio content and/or video content on a user's device, such as the UE 110. In some embodiments, any identifier (e.g., an internet protocol ("IP") address, a street address, a zip code, a telephone number, current location data such as GPS coordinates, etc.) associated with a user's device (e.g., the UE 110 and/or the subscribing clients 106A, 106N) that is located within the authorized streaming location 105 can be used to confirm that the particular device is authorized to receive a content stream to present audio output and/or video output corresponding with the media broadcast event 120. It should be understood that the examples provided are for illustration purposes only, and therefore should not be construed as limiting in any way.

In various embodiments, the operating environment 100 can include one or more instances of a user equipment, such as the UE 110. The UE 110 can include a display 111, a processor 112, a memory 113 and a media content player 114 that can be stored in the memory 113. The processor 112 can include one or more hardware components that perform computations to process data, and/or to execute computer-executable instructions of one or more application programs, operating systems, and/or other software, to provide, at least in part, presentation of audio content and performance of one or more operations and functions described herein. In some embodiments, the memory 113 can include volatile and/or non-volatile memory implemented in any method or technology for storage of information such as computer-readable instructions, data structures, program modules, or other data disclosed herein. It is understood that, use of the term "memory" (or variations thereof, such as but not limited to virtual memory) in the claims does not include, and shall not be construed to include, a wave or a signal per se and/or communication media. The memory 113 can store the media content player 114 that can be executed by the processor 112. The media content player 114 can facilitate the audio output and/or visual output of media content (e.g., audio content from an assembled media stream 170 discussed herein) via the display 111. It is understood that the display 111 can include hardware components, such as one or more instance of audio speakers 111A, that provide presentation of audio content such that audio output can be provided to a user and/or hardware components, such as one or more instances of a digitizer and/or screen, that provide presentation of video content and/or user interface for visual output and/or receiving input from the user 108. As such, in various embodiments, the media content player 114 may be configured to enable the UE 110 to display visual images and/or produce audio output as audible sounds. Embodiments of an instance of user equipment (e.g., the UE 110) can include, but should not be limited to, a mobile communications device, a desktop computer, a laptop computer, a tablet, a smart wearable device (e.g., smart-glasses, a smart watch, a fitness device), a smart home appliance (e.g., a smart refrigerator, a smart thermostat), a smart television, a smart dongle, a vehicle head unit, in-vehicle entertainment, and/or any other computing systems that can send and/or receive communications (e.g., an audio source selection interface package 180, an assembled media stream 170, a custom audio source map 154, an audio source configuration message 109, or any other data) with the network 102 and/or the control network 104. Further discussion of an embodiment of a UE capable of implementing aspects of the operating environment 100 is provided below with respect to FIG. 7. It should be understood that the examples provided are for illustration purposes only, and therefore should not be construed as limiting in any way.

In various embodiments, the operating environment 100 can include one or more instance of the media broadcast event 120. The media broadcast event 120 can include any action, performance, event, or other instance of content creation that includes one or more instances of an audio source by which audio output is produced by the one or more audio sources and capable of being captured or otherwise recorded by one or more instance of an audio capture device. Examples of the media broadcast event 120 can include, but should not be limited to, a sporting event, a film episode, a nightly newscast, a webcast, a podcast, a network streaming event, a video program delivered by a network service, a live video and/or audio feed, a time-delayed video and/or audio feed, an internet protocol call, or any other entity or device that is capable of producing or emitting sounds so as to provide audio output that can be captured by an audio capture device. In various embodiments, the media broadcast event 120 can include multiple audio sources that produce or otherwise create audible sounds that represent audio output, such as an audio source 122A, an audio source 122B, and an audio source 122N. It is understood that although three instances of an audio source are illustrated in FIG. 1, this may not necessarily be the case for all embodiments, and therefore the examples provided are for illustration purposes that should not be construed as limiting in any way.

In the embodiments discussed herein, each instance of an audio source (e.g., the audio sources 122A, 122B, and 122N) provides distinct audio output that is unique to the audio source. For example, in an embodiment where the media broadcast event 120 corresponds with a professional sporting activity, the audio source 122A may correspond with one or more athletes on the sport field as they engage in the sporting activity, the audio source 122B may correspond with color commentary (e.g., professional sports announcers who provide audible descriptions, status updates, or any other audible commentary) related to the media broadcast event 120, and the audio source 122N may correspond with stadium background noise provided by fans and audience members that are attending the media broadcast event 120. It is understood that the various audio sources may not necessarily correspond with humans, but instead may be produced by environmental elements, animals, devices, generated sound effects, or any other source that can provide audio output. By way of another example, in an embodiment where the media broadcast event 120 corresponds with a nightly gameshow (e.g., created by a film studio, a mobile application producer, or any other content creator), then each of the following entities may represent a separate instance of an audio source, such as but not limited to the gameshow host, each gameshow contestant, the viewing audience, the sound effects, the announcer, the theme music, and any other distinct entity which may individually and/or collectively produce an audio output that can be distinct and capable of being captured by an audio capture device. It should be understood that the examples provided are for illustration purposes only, and therefore should not be construed as limiting in any way.

In various embodiments, at least one instance of an audio capture device can be associated with an audio source. For example, the audio capture device 124A can capture audio output produced by the audio source 122A, the audio capture device 124B can capture audio output produced by the audio source 122B, and the audio capture device 124N can capture audio output produced by the audio source 122N. An audio capture device (e.g., any of the audio capture devices 124A, 124B, and 124N) can include any device that includes components and/or circuitry by which to receive, obtain, or otherwise capture audio produced from a corresponding audio source and generate, transform, and/or otherwise provide a raw audio stream based on the distinct audio content that was captured from the audio source. As such, various embodiments of an audio capture device (e.g., any of the audio capture devices 124A, 124B, and 124N) can include a microphone or other transducer that can capture audio from an audio source, circuitry by which to generate a raw audio stream, and a communication interface by which the raw audio stream can be provided to the control system

130. In some embodiments, the audio capture devices 124A, 124B, and 124N may be configured substantially similar to each other.

By way of example, when the audio source 122A produces audio output, the audio capture device 124A may capture this audio output via generation of a raw audio stream 126A. Similarly, when the audio source 122B produces audio output, the audio capture device 124B may capture this audio output via generation of a raw audio stream 126B, and when the audio source 122N produces audio output, the audio capture device 124N may capture the audio output via generation of a raw audio stream 126N. A raw audio stream (e.g., any of the raw audio streams 126A, 126B, and/or 126N) refers to audio data that has not yet been formatted, encoded, or otherwise configured to conform to a standard protocol, such as a protocol (e.g., an RTP specification) defined by a protocol profile 137 as discussed below.

In various embodiments, each instance of an audio capture device (e.g., the audio capture devices 124A, 124B, and 124N) can be associated with an audio source identifier that identifies or otherwise indicates the audio source that provides the audio which is captured in the corresponding raw audio stream. For example, an audio source identifier 123A can be associated with the audio source 122A, an audio source identifier 123B can be associated with the audio source 122B, and an audio source identifier 123N can be associated with the audio source 122N. As such, in some embodiments, each audio capture device can be assigned an audio source identifier based on the corresponding audio source from which a raw audio stream is generated. For example, the audio source 122A, the audio capture device 124A, and/or the raw audio stream 126A can be associated with the audio source identifier 123A. Similarly, the audio source 122B, the audio capture device 124B, and/or the raw audio stream 126B can be associated with the audio source identifier 123B. Additionally, the audio source 122N, the audio capture device 124N, and/or the raw audio stream 126A can be associated with the audio source identifier 123N.

In some embodiments, instances of the audio source identifier 123A, the audio source identifier 123B, and the audio source identifier 123N, may be stored in a broadcast event profile 128, which in turn can be stored in a memory storage device that is accessible to the control system 130 and/or the digital headend system 150, which are discussed below. The broadcast event profile 128 can include a broadcast event identifier 129 that provides an identity of the media broadcast event 120, where the broadcast event identifier 129 may be included in various aspects of data discussed herein so as to associate the data with the media broadcast event 120 and/or one or more associated audio sources (e.g., the audio sources 122A, 122B, and/or 122N). In some embodiments, the broadcast event identifier 129 can be included as metadata within various communications and data discussed herein. It should be understood that the examples provided are for illustration purposes only, and therefore should not be construed as limiting in any way.

In various embodiments, each raw audio stream (e.g., the raw audio streams 126A, 126B, and 126N) can be provided to the control system 130. The operating environment 100 illustrated in FIG. 1 shows each of the raw audio streams 126A, 126B, and 126N being provided directly to the control system 130 from the corresponding audio capture devices (e.g., the audio capture devices 124A, 124B, and 124N, respectively), however this may not necessarily be the case in every embodiment. In some embodiments, the raw audio streams 126A, 126B, and 126N may be provided via an intermediary, such as but not limited to the network 102, the control network 104, and/or other network devices via one or more communication links. As such, it should be understood that the examples provided are for illustration purposes only, and therefore the examples provided should not be construed as limiting in any way.

In various embodiments, the operating environment 100 can include the control system 130. The control system 130 can include a processor 131, a memory storage device ("memory") 132, a premixer 134, a packetizer 135, and an aggregator 136. The control system 130 can also include communication components, such as a transceiver and communication interfaces, that can provide communicative coupling between various elements of the operating environment 100, such as to allow for the sending and receiving of various data, such as the raw audio streams 126A, 126B, 126N and any other data and/or communications discussed herein. The processor 131 can include one or more hardware components that perform computations to process data, and/or to execute computer-executable instructions of one or more application programs, operating systems, and/or other software, to provide, at least in part, any services or composition of services described herein. For example, the processors 131 can include one or more central processing units ("CPUs") configured with one or more processing cores, one or more graphics processing unit ("GPU") configured to accelerate operations performed by one or more CPUs, and/or one or more systems on a chip ("SOC") to perform computations to process data, and/or to execute computer-executable instructions of one or more application programs, operating systems, and/or other software that may or may not include instructions particular to graphics and/or communications computations. Further discussion of embodiments of the processor 131 as a processing unit and/or compute resources can be found with respect to FIG. 6.

In various embodiments, the memory 132 can include one or more hardware components that perform and/or provide storage operations, including temporary or permanent storage operations. In some embodiments, the memory 132 can include volatile and/or non-volatile memory implemented in any method or technology for storage of information such as computer-readable instructions, data structures, program modules, or other data disclosed herein. It is understood that, use of the term "memory" (or variations thereof, such as but not limited to virtual memory) in the claims does not include, and shall not be construed to include, a wave or a signal per se and/or communication media. In various embodiments, the memory 132 can include and store a control application 133, the protocol profile 137, and/or the broadcast event profile 128. In some embodiments, an audio source isolation service, such as the audio source isolation service 152, can include one or more instances of computer-executable instructions that may be stored in the memory 132 so as to perform one or more operations therein. For example, in some embodiments, the control application 133 may be configured as a software module that supports or otherwise provides, at least in part, the audio source isolation service 152 via the performance of one or more operations, functions, and/or aspects discussed herein. The audio source isolation service 152 can, at least in part, provide and enable aspects for selective presentation of audio content. In various embodiments, the control application 133 may direct, manage, and/or otherwise control at least a portion of the audio source isolation service 152. In various embodiments, one or more components of the operating environment 100 may be initiated and/or managed by the control application 133 and/or the audio source isolation service 152. It should be understood that the examples provided are for illustration purposes only, and therefore should not be construed as limiting in any way.

The control system 130 can include one or more instances of the premixer 134. In some embodiments, the premixer 134 may include hardware components and/or software modules by which to receive individual instances of raw audio streams (e.g., the raw audio streams 126A, 126B, and 126N). For example, the premixer 134 can include circuitry and a plurality of communication interfaces that provide communicative coupling between an audio capture device (e.g., any of the audio capture devices 124A, 124B, and 124N) and the control system 130. In various embodiments, the premixer 134 may analyze, process, transform, and/or configure an instance of a raw audio stream without combining or otherwise mixing two or more instances of a raw audio stream together. For example, in some embodiments, the control application 133 may instruct the premixer 134 to receive or otherwise obtain multiple raw audio streams while keeping each raw audio stream isolated from each other during processing and configuration. As such, each of the raw audio streams 126A, 126B, and 126N can be configured separately so as to maintain isolation and distinction between the audio content that each of the raw audio streams 126A, 126B, and 126N provides from respective audio sources. In some embodiments, the premixer 134 can independently (re)configure, encode, and/or transform the raw audio streams 126A, 126B, and 126N so as to apply one or more specifications and/or formats from a standardized protocol profile, such as the protocol profile 137, which will be discussed below. By this, the premixer 134 can be used to modify, adjust, transform, encode, and/or configure each of the raw audio streams 126A, 126B, and 126N so as to no longer be considered as raw data due to formatting and transformation based on the protocol profile 137. In some embodiments, the premixer 134 may not mix audio content from each of the raw audio streams 126A, 126B, and 126N together, and thus can act on each of the raw audio streams 126A, 126B, and 126N independently so that the audio sources can be individually selected. In some embodiments, the media broadcast event 120 may provide a video source that can be captured and obtained by the control system 130 in a raw video stream 127. In some instances, the raw video stream 127 may be analyzed and configured by the premixer 134 and/or the control application 133 so as to transform the raw video stream 127 into a format that conforms with the protocol profile 137. It should be understood that the examples provided are for illustration purposes only, and therefore should not be construed as limiting in any way.

The operating environment 100 can also include a packetizer, such as the packetizer 135, that is communicatively coupled to the premixer 134. The packetizer 135 can operate in coordination with the control application 133 and the premixer 134 to transform and configure each of the raw audio streams 126A, 126B, and 126N and create instances of a packetized audio data set that is associated with audio output from a specific audio source, such as packetized audio data set 140A that is associated with the audio source 122A, packetized audio data set 140B that is associated with the audio source 122B, and packetized audio data set 140N that is associated with the audio source 122N. The packetizer 135 can be configured as a software module, a script, or other set of computer-executable instructions that can create audio data packets based on an instance of a raw audio stream such that collectively the audio data packets provide an audio data packet set and individually, each of the audio data packets corresponds with a single audio source. For example, the packetized audio data set 140A can include a plurality of audio data packets that are each configured to provide audio content from the audio source 122A in a format defined by the protocol profile 137. Similarly, the packetized audio data set 140B can include a plurality of audio data packets that are each configured to provide audio content from the audio source 122B, and the packetized audio data set 140N can include a plurality of audio data packets that are each configured to provide audio content from the audio source 122N.

In various embodiments, the control application 133 and the audio source isolation service 152 may use a standard protocol defined by the protocol profile 137 to form the basis by which the packetized audio data sets 140A, 140B, and 140N are configured and formatted. For example, the protocol profile 137 can define an RTP specification created by the Internet Engineering Task Force ("IETF"). An example of a specification of a standard protocol defined by the protocol profile 137 can include, but should not be limited to, one or more standard documents provided by a Request for Comments ("RFC") 3350, RFC 3351, RFC 3190, RFC 6184, RFC 6416, RFC 7587, or any other standard provided by a standards organization, such as but not limited to the IETF. The protocol profile 137 may include multiple instances of a fixed protocol value 138 that each defines a value corresponding to specific payload type. For example, in conventional systems, if an audio data packet is to strictly conform to the standard protocol (e.g., a protocol defined by RFC 3351), then every instance of an audio data packet must use the same fixed protocol value 138 irrespective of which audio source corresponds with that audio data packet. As such, conventional configuration of data packets that include audio content do not enable individualized selection and execution of data packets that correspond with specific audio sources. Therefore, embodiments of the present disclosure enable the control system 130 to conform to aspects of the standard protocol defined by the protocol profile 137, while providing the ability to enable selection of audio data packets corresponding with specific audio sources that can be isolated for execution from their corresponding packetized audio data sets such that audio output can be provided from only the audio sources that are selected by a user. It should be understood that the examples provided are for illustration purposes only, and therefore should not be construed as limiting in any way.

In various embodiments, the selective presentation of audio content may be facilitated, at least in part, by the generation of a unique instance of an audio isolation tag for each packetized audio data set, such as an audio isolation tag 142 associated with the packetized audio data set 140A, an audio isolation tag 144 associated with the packetized audio data set 140B, and an audio isolation tag 146 associated with the packetized audio data set 140N. Each of the audio isolation tags 142, 144, and 146 includes a unique value that is selected from among an undefined protocol value index 139. Instead of using the fixed protocol value 138 that is defined according to a standard specification to indicate a payload type for "audio" (where the same fixed protocol value 138, such as the value "2,", can be used for every data packet that provides audio content, but if used, cannot provide an indication as to which particular audio source provides the audio content), the protocol profile 137 can indicate and provide a list of values that are not defined or otherwise used by a standard protocol, where the plurality of available undefined protocol values are listed in the undefined protocol value index. For example, in a conventional system, an audio data packet would be assigned and/or be associated with the fixed protocol value 138 to indicate the presence of audio content (irrespective of audio source) in order to conform to the standard protocol defined by the protocol profile 137. In various embodiments discussed herein, the control system 130 can create instances of audio data packets that make up each of the packetized audio data sets 140A, 140B, and 140N such that the audio source that corresponds with each packetized audio data set is represented by an instance of an audio isolation tag that is included in the corresponding packetized audio data set.

For example, in an embodiment, the undefined protocol value index 139 may indicate that values 17-89 are undefined in the standard protocol (e.g., RTP) corresponding to the protocol profile 137, and thus values 17-89 are not used by the standard protocol. As such, in this example, the control application 133 and/or the packetizer 135 can create the audio isolation tag 142 and assign, set, store or otherwise indicate an undefined protocol value of "17" that will represent the audio source 122A and audio output that is represented by the audio content stored in the audio data packets of the packetized audio data set 140A. Continuing with this example, the packetized audio data set 140B can be assigned or otherwise have the audio isolation tag 144 that indicates an undefined protocol value of "39" so as to represent the audio source 122B. In this example, the packetized audio data set 140N can be assigned or otherwise have the audio isolation tag 146 that indicates an undefined protocol value of "87" so as to represent the audio source 122N. It is understood that the actual number used in the example is for illustration purposes only. In various embodiments, the value used for the specific instance of an audio isolation tag is selected from amongst the undefined protocol value index 139 so as not to conflict or otherwise interfere with the fixed protocol value 138 that is used to generally indicate the presence of audio content without distinction as to a particular audio source. It should be understood that the examples provided are for illustration purposes only, and therefore should not be construed as limiting in any way.

An instance of an audio isolation tag (e.g., any of the audio isolation tags 142, 144, and 146) can bind an audio source (and thus audio output from the audio source) to a specific instance of a packetized audio data set. For example, the audio isolation tag 142 can bind the audio source 122A to the packetized audio data set 140A, the audio isolation tag 144 can bind the audio source 122B to the packetized audio data set 140B, and the audio isolation tag 146 can bind the audio source 122N to the packetized audio data set 140N. This binding provided by an audio isolation tag (e.g., any of the audio isolation tags 142, 144, and 146) can enable the packetized audio data set (and thus audio data packets included therein) to be identified and isolated such that execution of the packetized audio data set can be initiated individually (i.e., apart from execution of another packetized audio data set that provides audio output from another audio source) so as to cause presentation of audio output from a corresponding audio source. In some embodiments, an audio isolation tag (e.g., any of the audio isolation tags 142, 144, and 146) may be a stored value within a header and/or field (e.g., a payload type fields) of a corresponding packetized data set (e.g., the packetized audio data sets 140A, 140B, and 140N, respectively). An instance of an audio isolation tag (e.g., any of the audio isolation tags 142, 144, and 146) can enable a corresponding packetized audio data set (and thus audio data packets included therein) to be identified and isolated such that execution of the packetized audio data set is not performed or otherwise occur when the audio source corresponding to the packetized audio data set is not selected for presentation. As such, when the user 108 does not desire to hear audio output from a certain audio source, the corresponding audio isolation tag can be referenced (e.g., via use of a custom audio source map 154 discussed below) to identify the corresponding packetized data set and cause the media content player 114 of the UE 110 to suppress execution of the audio data packet set so as not to hear audio output from the non-selected audio source. Further discussion regarding individual execution and suppression of packetized data sets will be provided below with respect to the custom audio source map 154.

In various embodiments, the control system 130 can include the aggregator 136. In some embodiments, the aggregator 136 can be included within and/or controlled by the control application 133 and/or the audio source isolation service 152. The aggregator 136 can be configured as a software module, routing, or other computer-executable instructions by which the control system generates one or more content streams. The control application 133 and/or the aggregator 136 can configure and format a packetized audio data set (e.g., any of the packetized audio data sets 140A, 140B, 140N) based at least in part on the protocol profile 137 so as to create a content stream (e.g., any of a packetized audio set stream 172A, a packetized audio set stream 172B, and a packetized audio set stream 172N) that can be sent via one or more networks (e.g., the network 102 and/or the control network 104) and provided to a UE (e.g., the UE 110) for presentation. For example, the control application 133 and/or the aggregator 136 can assemble and configure audio data packets of the packetized audio data set 140A so as to create a packetized audio set stream 172A that includes the audio isolation tag 142. Stated differently, the packetized audio set stream 172A includes the packetized audio data set 140A and the audio isolation tag 142. The control application 133 and/or the aggregator 136 can create a packetized audio set stream 172B that includes the packetized audio data set 140B and the audio isolation tag 144. The control application 133 and/or the aggregator 136 can create a packetized audio set stream 172N that includes the packetized audio data set 140N and the audio isolation tag 146. In some embodiments, an audio isolation tag (e.g., the audio isolation tags 142, 144, 146) may be inserted, stored, or otherwise included within a header associated with the corresponding packetized data set (e.g., the packetized audio data sets 140A, 140B, 140N, respectively). It is understood that the packetized audio set streams 172A, 172B, and 172N include the packetized audio data sets 140A, 140B, 140N, respectively, that are being provided as one or more content streams to a device (e.g., the UE 110). It should be understood that the examples provided are for illustration purposes only, and therefore should not be construed as limiting in any way.

The operating environment 100 can include an instance of the assembled media stream 170 that is associated with the media broadcast event 120. In various embodiments, the user 108 may access a media delivery service to request that audio content and/or video content associated with the media broadcast event 120 be provided to the user's device (e.g., the UE 110). In some embodiments, an instance of the assembled media stream 170 can be a single content stream that includes the packetized audio data sets 140A, 140B, and 140N, where each of the packetized audio data sets 140A, 140B, and 140N can include the audio isolation tags 142, 144, and 146, respectively, and thus can be processed for selective presentation of audio content from specific audio sources. In some embodiments, the assembled media stream 170 can include a plurality of content streams, such as the packetized audio set streams 172A, 172B, 172N that are bundled together and associated with each other, but maintained as separate content streams which may be delivered in parallel and/or in sequence. The assembled media stream 170 can include each of the packetized audio set streams 172A, 172B, 172N that can be bundled together under a shared identifier (e.g., the broadcast event identifier 129) such that each of the packetized audio set streams 172A, 172B, 172N are sent in sequence and/or in parallel to a UE (e.g., the UE 110). Irrespective of whether the assembled media stream 170 is configured as a single stream or a plurality of streams, the assembled media stream 170 can provide the packetized audio data sets 140A, 140B, and 140N to a device (e.g., the UE 110 and/or the subscribing clients 106A, 106N) to enable selective presentation of audio content from specific audio sources.

In an embodiment, the assembled media stream 170 can include a combined audio source stream 174 that provides a combined audio source data set 148. The audio source data set 148 includes a combination, aggregation, and/or mixture of all audio content from all of the audio sources 122A, 122B, 122N mixed together such that execution of the combined audio source data set 148 causes presentation of audio output from all of the audio sources 122A, 122B, and 122N. In some embodiments, the combined audio source data set 148 may be provided to the UE 110 so that presentation of audio output corresponding to the media broadcast event 120 can occur by default and/or initially before execution of the packetized audio data sets 140A, 140B, 140N occurs. For example, in some embodiments, prior to a user (e.g., the user 108) indicating a selection of specific audio sources that are permitted to provide audio output (e.g., via a selection indicated in an instance of an audio source configuration discussed below and discussed with respect to FIGS. 2A and 2B), the media content player 114 may execute and present the combined audio source data set 148 that present all audio output, irrespective of the specific audio source. The combined audio source data set 148 can include an instance of the fixed protocol value 138 so as to cause the media content player 114 to begin presenting audio output from all of the audio sources 122A, 122B, and 122N. As such, the combined audio source data set 148 does not include an instance of an audio isolation tag and/or an undefined protocol value selected from the undefined protocol value index. It is understood that the combined audio source data set 148 is not a combination of the packetized audio data sets 140A, 140B, and 140N, but rather a separate data set that can be created by the control application 133, the packetizer 135, and/or the premixer 134 based on mixing and combining all of the raw audio streams 126A, 126B, and 126N together and assigning and/or setting the combined audio source data set 148 with the fixed protocol value 138 (e.g., an RTP payload type value that is defined by the protocol profile 137 so as to indicate audio content without audio source distinction). In some embodiments, the media content player 114 may execute the combined audio source data set 148 using the fixed protocol value 138 without being pointed to, or otherwise referencing, a custom audio source map that is created for a device based on the master audio source map 160, such as the custom audio source map 154 that is created for the UE 110 based on the master audio source map 160, which is discussed in further detail below.

The media content player 114 can be configured to conform to the protocol profile 137 such that when an instance of the fixed protocol value 138 is indicated by the combined audio source data set 148, then the media content player 114 can execute the corresponding data so as to provide output, such as the presentation of audio output. Comparatively, when the media content player 114 analyzes received data and discovers an instance of an audio isolation tag instead of the fixed protocol value 138, then the media content player 114 may be instructed to obtain and/or reference a custom audio source map, such as the custom audio source map 154, which is discussed below. In some embodiments, the media content player 114 may suppress execution of the packetized audio data sets 140A, 140B, and 140N until a custom audio source map is provided to the media content player 114 based on one or more selections from a user (e.g., the user 108) corresponding to which of the various audio sources should be allowed to present audio output.

In an embodiment, the assembled media stream 170 can include a video data stream 176 that includes packetized video data configured based on the raw video stream 127 and the protocol profile 137. In some embodiments, the video data stream 176 can be configured to be presented in sync with audio output from one or more of the audio sources 122A, 122B, and/or 122N of the media broadcast event 120. In some embodiments, one or more of the packetized audio data sets 140A, 140B, and/or 140N may provide audio content that can present audio output from a corresponding audio source while visual content is being presented on the UE 110 via execution of the video data stream 176. In some embodiments, the video data stream 176 may be provided to a user upon request, thereby enabling the user to listen to only audio output for the media broadcast event 120 if desired. It should be understood that the examples provided are for illustration purposes only, and therefore should not be construed as limiting in any way.

In various embodiments, one or more instances of the assembled media stream 170 can be provided to one or more customer devices, such as but not limited to the UE 110 and/or the subscribing clients 106A, 106N. In some embodiments, the assembled media stream 170 can be configured for the media broadcast event 120 such that multiple instances of the assembled media stream 170 are delivered to each customer device, where each of the instances have the same configuration. Despite multiple instances of the assembled media stream 170 being provided to more than one device (e.g., the UE 110 and/or the subscribing clients 106A, 106N), each customer device can be enabled to select the specific audio sources for presentation of audio content via the use of an audio source selection interface package, such as the audio source selection interface package 180 discussed below. In various embodiments, the assembled media stream 170, along with any data included therein, such as but not limited to the packetized audio set streams 172A, 172B, 172N, the combined audio source stream 174, the video data stream 176, the packetized audio data sets 140A, 140B, 140N, and/or the combined audio source data set 148, can be directed to an instance of the media content player 114 on a user device (e.g., the UE 110) for execution and presentation of audio output. In various embodiments, an instance of the audio source selection interface package 180 also can be provided to a user device (e.g., the UE 110 and/or the subscribing clients 106A, 106N) independent of, and/or within, the assembled media stream 170. The control application 133 can instruct an instance of the media content player 114 to execute the audio source selection interface package 180 so as to allow for presentation of one or more interface that enables selection of audio sources, such as further discussed below with respect to FIGS. 2A and 2B.

In various embodiments, the control application 133 can generate an instance of the audio source selection interface package 180 that can accompany the packetized audio data sets 140A, 140B, 140N of the assembled media stream 170. The audio source selection interface package 180 is associated with the media broadcast event 120 and may be provided to a customer device (e.g., any of the UE 110 and/or the subscribing clients 106A, 106N) so as to enable a user interface by which audio sources can be selected. The audio source selection interface package 180 can instruct a customer device (e.g., the UE 110) to present an audio source customization interface. The audio source selection interface package 180 can be configured to instruct an instance of the media content player 114 to present an audio source customization interface, such as one or more interfaces shown and discussed with respect to FIGS. 2A and 2B below.

In various embodiments, the audio source selection interface package 180 can include data and instructions that command a device (e.g., the UE 110) to present buttons, menus, or other interactive content objects that enable a user (e.g., the user 108) to identify and indicate which audio sources should be allowed to present audio output on the device. For example, the audio source selection interface package 180 can include each of the audio source identifiers 123A, 123B, and 123N that correspond with the audio sources 122A, 122B, and 122N, respectively, and are also associated with the packetized audio data sets 140A, 140B, and 140N, respectively. Each of the audio source identifiers 123A, 123B, and 123N can be linked or otherwise associated with an interactive content object (e.g., a button or other selectable indicator) of an audio source customization interface that can be presented on the display 111 by the media content player 114 in response to execution of the audio source selection interface package 180, such as shown and discussed with respect to FIGS. 2A and 2B below. An instance of an audio source customization interface (e.g., an audio source customization interface 202 shown in FIGS. 2A and 2B) can be configured to generate an audio source configuration message (e.g., the audio source configuration message 109) in response to input from a user (e.g., the user 108), where the input can correspond with indicating an audio source identifier via selecting an audio source, which will be discussed in further detail with respect to FIGS. 2A and 2B). It should be understood that the examples provided are for illustration purposes only, and therefore should not be construed as limiting in any way.

In various embodiments, the operating environment 100 can include a master audio source map 160 that is associated with the media broadcast event 120, and thus corresponds with audio output from any of the audio sources 122A-122N. The control application 133 may generate a master audio source map 160 that is based on the audio isolation tags 142, 144, and 146 that are used to bind the audio sources 122A, 122B, and 122N of the media broadcast event 120 to the corresponding packetized audio data sets 140A, 140B, and 140N, respectively, that carry audio content for presentation of specific audio output form the corresponding audio sources. As such, the master audio source map 160 can be generated and uniquely configured based on the specific instances of audio isolation tags (e.g., the audio isolation tags 142, 144, and 146) in use (i.e., present within the packetized audio data sets 140A, 140B, and 140N of the assembled media stream 170). The master audio source map 160 can include one or more audio isolation tag definitions 162A-162N that are generated based on the audio isolation tags (e.g., the audio isolation tags 142, 144, and 146) in order to associate an instance of an audio source and audio source identifier with a corresponding packetized audio data set.

To understand the role and functions of the master audio source map 160 and the audio isolation tag definitions 160A-162N, a brief discussion regarding how the media content player 114 is instructed to handle execution of data is provided. In various embodiments, when the media content player 114 receives data that includes and/or provides the fixed protocol value 138 (which is an expected value indicating a payload type such as audio content, video content, and/or content conforming to a standard protocol defined in the protocol profile 137), the media content player 114 is triggered to execute and present audio and/or video output irrespective of the content source (e.g., present audio output by executing the data due to the fixed protocol value 138 indicating that the data is to be decoded and executed so as to generally present audio output). Therefore, when the fixed protocol value 138 is not provided or otherwise included in an instance of data, which is the case with the packetized audio data sets 140A-140N that include the audio isolation tags 142, 144, 146 instead of the fixed protocol value 138, then the media content player 114 is triggered to pause, suspend, or otherwise not execute the packetized audio data sets 140A-140N and not present audio output from the audio content provided by the audio sources 122A-122N, respectively. Therefore, the media content player 114 can be commanded to execute individual instances of one or more of the packetized audio data sets 140A-140N by instructing the media content player 114 to reference an instance of an audio isolation tag definition (e.g., any of the audio isolation tag definitions 162A-162N) that can trigger execution and presentation of audio output for a corresponding audio source. The audio isolation tag definitions 162A-162N may be provided to a device (e.g., the UE 110 and/or the subscribing clients 106A, 106N) and/or the media content player 114 via an instance of a custom audio source map (e.g., one of custom audio source maps 154, 157A, 157N). In some embodiments, a custom audio source map can include an audio isolation tag definition set (e.g., audio isolation tag definition sets 156, 158, 159) that includes one or more of the audio isolation tag definitions 162A-162N that are provided to the device (e.g., the UE 110 and/or the subscribing clients 106A, 106N) based on an instance of an audio source configuration message (e.g., audio source configuration messages 107A, 107N, and 109).

In various embodiments, each instance of an audio isolation tag definition (e.g., the audio isolation tag definitions 162A-162N) can include, and correspond with, an instance of an audio isolation tag (e.g., one of the audio isolation tags 142, 144, 146). As such, the total number of audio isolation tag definitions 162A-162N that are created for the master audio source map 160 will correspond with the total number of audio isolation tags created for the media broadcast event 120 (e.g., the audio isolation tags 142, 144, and 146 created for the packetized audio data sets 140A-140N associated with the media broadcast event 120). For example, in the operating environment 100 shown in FIG. 1, there may be three audio isolation tags (e.g., the audio isolation tags 142, 144, and 146) which correspond with the audio sources 122A, 122B, and 122N, respectively. The control application 133 can, in turn, generate three instances of an audio isolation tag definition that can be stored in the master audio source map 160. By way of example, the master audio source map 160 can include the audio isolation tag definition 162A corresponding to the audio isolation tag 142, the audio isolation tag definition 162B corresponding to the audio isolation tag 144, and the audio isolation tag definition 162N corresponding to the audio isolation tag 146. It is understood that the amount of instances discussed in the examples are for illustration purposes only, and therefore should not be construed as limiting in any way.

In various embodiments, each instance of an audio isolation tag definition (e.g., the audio isolation tag definitions 162A-162N) provides a reference or other indication of an association between an instance of an audio isolation tag and an instance of an audio source identifier. For example, the audio isolation tag definition 162A can indicate an association between the audio source identifier 123A for the audio source 122A and the audio isolation tag 142 for the packetized audio data set 140A. In some embodiments, the audio isolation tag definition 162B can indicate an association between the audio source identifier 123B for the audio source 122B and the audio isolation tag 144 for the packetized audio data set 140B. In some embodiments, the audio isolation tag definition 162N can indicate an association between the audio source identifier 123N for the audio source 122N and the audio isolation tag 146 for the packetized audio data set 140N. By this, the master audio source map 160 can be configured to store the relationship and association between the audio sources 122A-122N and the packetized audio data sets 140A-140N through one or more instances of the audio isolation tag definitions 162A-162N.

In some embodiments, each instance of an audio isolation tag definition (e.g., any of the audio isolation tag definitions 162A-162N) can indicate to the user device (e.g., the UE 110 and/or the subscribing clients 106A-106N) that the corresponding packetized audio data set provides audio content for presentation of audio output despite the packetized audio data set lacking (or otherwise not including or indicating) the fixed protocol value 138. Therefore, each instance of an audio isolation tag definition (e.g., any of the audio isolation tag definitions 162A-162N) can instruct the media content player 114 to execute the one or more audio data packets of the corresponding packetized audio data set to provide and present audio output from a corresponding audio source. In some embodiments, an instance of an audio isolation tag definition (e.g., any of the audio isolation tag definitions 162A-162N) can indicate or refer to the fixed protocol value 138 so as to inform the media content player 114 that the audio data packets of the packetized audio data set (e.g., the corresponding one of the packetized audio data sets 140A-140N) represent audio content. By this, the media content player 114 can be instructed, based on an audio isolation definition (e.g., any of the audio isolation tag definitions 162A-162N) to operate and selectively execute an instance of a packetized audio data set to present audio output from a corresponding audio source.

In various embodiments, the master audio source map 160 can be created so as to store all of the audio isolation tag definitions 162A-162N that correspond with the audio isolation tags 142, 144, 146. The master audio source map 160 can be configured to enable extraction of one or more of the audio isolation tag definitions 162A-162N so as to facilitate the creation of an instance of a custom audio source map, such as any of the custom audio source maps 154, 157A, and/or 157N discussed below in further detail. In some embodiments, the master audio source map 160 can be provided to the digital headend system 150. In some embodiments, the digital headend system 150 can support, host, or otherwise facilitate the operation of the audio source isolation service 152 which, in some embodiments, may retain and make available the master audio source map 160 for the creation of a custom audio source map (e.g., any of the custom audio source maps 154, 157A, 157N). In various embodiments, the digital headend system 150 can provide other network services discussed herein. The digital headend system 150 can be configured as one or more server computing systems that can send and/or receive data from one or more devices within the control network 104 and/or the network 102 so as to facilitate various functions and operations that support communication services, such as the audio source isolation service 152. In some embodiments, one or more instances of the assembled media stream 170 may be routed or otherwise provided through the control network 104 and/or the digital headend system 150. In some embodiments, the digital headend system 150 may include one or more components of the control system 130 and may perform one or more of the operations discussed herein. In some embodiments, the digital headend system 150 may be invoked or otherwise used to perform operations for decoding, multiplexing, encoding, transmission and/or routing via one or more of a modulator, an integrated received decoder, a decoder, an encoder, and/or various servers (e.g., a subscriber management server, conditional access server, a management server, or the like). It should be understood that the examples provided are for illustration purposes only, and therefore should not be construed as limiting in any way.

In various embodiments, each user equipment may not be provided the master audio source map 160 that was created and provided to the digital headend system 150. However, in order to be provided an instance of one or more of the audio isolation tag definitions 162A-162N, an instance of a custom audio source map (e.g., one of the custom audio source maps 154, 157A, 157N) can be created specifically for a particular user equipment based on input and selection of audio sources via an instance of an audio source configuration message (e.g., any of the audio source configuration messages 109, 107A, 107N). For example, the audio source selection interface package 180 can be executed by a user equipment (e.g., the UE 110 and/or the subscribing clients 106A, 106N) when the media content player 114 receives and/or begins to execute the assembled media stream 170. In some embodiments, when an instance of user equipment (e.g., the UE 110 and/or the subscribing clients 106A, 106N) receives an instance of the assembled media stream 170 and the audio source selection interface package 180, the media content player 114 may seek to begin presenting audio output from all audio sources, such as via execution of the combined audio source data set 148 (which may be included in the assembled media stream 170 and/or within the combined audio source stream 174 that is a part of the assembled media stream 170). In some embodiments, the audio source selection interface package 180 can enable a user (e.g., the user 108) to select which audio sources should be permitted to present audio output, such as by a user equipment presenting an instance of the audio source customization interface 202 shown in FIGS. 2A and 2B and further discussed below. When a user (e.g., the user 108) accesses and/or interacts with the audio source customization interface 202, the user 108 may provide input that indicates a selection of one or more audio sources which are permitted to present audio output. The audio source selection interface package 180 can instruct the media content player 114 and/or the user equipment (e.g., the UE 110 and/or the subscribing clients 106A, 106N) to create an instance of an audio source configuration message 109 based on the user selection of audio sources.

For example, in an embodiment, the user 108 may interact with the audio source customization interface 202 and provide input indicating that the audio sources 122A and 122B are authorized to present audio output, but that the audio source 122N is not authorized to present audio output. In this example, the UE 110 can be instructed to create the audio source configuration message 109 that includes the audio source identifiers 123A and 123B associated with the audio sources 122A and 122B, respectively. The audio source identifiers 123A and 123B are included in the audio source configuration message 109 because the user 108 indicated that the audio sources 122A and 122B were selected and are authorized to provide audio content that is presented as audio output on the display 111 of the UE 110. The audio source configuration message 109 may not include the audio source identifier 123N associated with the audio source 122N because the user 108 did not select the audio source 122N, thereby indicating that the audio source 122N is not permitted or authorized to provide audio output. In order for the UE 110 and the media content player 114 to determine which of the packetized audio data sets 140A-140N corresponds with the audio sources 122A and 122B that are authorized to present audio output, the audio source configuration message 109 can be configured to request the creation of a custom audio source map that enables identification, decoding, and/or execution of one or more packetized audio data sets for presentation of audio output corresponding to the authorized audio sources (e.g., the audio source configuration message 109 requesting the creation of the custom audio source map 154 that enables identification, decoding, and/or execution of the packetized audio data sets 140A and 140B for presentation of audio output from the audio sources 122A and 122B, and suppression of audio output from the audio source 122N). Similarly, each of the subscribing clients 106A and 106N may receive an instance of the assembled media stream 170 and the audio source selection interface package 180. A user (e.g., the user 108 or any other user) may provide input that selects and/or indicates authorization of one or more audio sources, and in turn the subscribing clients 106A and 106N can create the audio source configuration messages 107A and 107N, respectively, that each reflects the corresponding audio source selection. In various embodiments, each of the audio source configuration messages 107A, 107N, and/or 109 can include one or more of the audio source identifiers 123A-123N based on audio source selection, where the audio source identifiers 123A-123N may be provided to each user equipment (e.g., the UE 110 and/or the subscribing clients 106A, 106N) via the audio source selection interface package 180. It should be understood that the examples provided are for illustration purposes only, and therefore should not be construed as limiting in any way.

In various embodiments, instances of an audio source configuration message (e.g., any of the audio source configuration messages 109, 107A, and 107N) may be provided to an application, a network service, a system, and/or any other device or service that is configured to facilitate creation of a custom audio source map, such as one or more of the digital headend system 150, the audio source isolation service 152, the control system 130, and/or the control application 133. In the embodiment of the operating environment 100 shown in FIG. 1, the audio source isolation service 152 may be used to receive the audio source configuration messages 109 and create the custom audio source maps 154, 157A, and 157N, however this may not necessarily be the case in all embodiments. In some embodiments, the control application 133, the digital headend system 150, and/or the control system 130 may be used to create one or more of the custom audio source maps 154, 157A, and 157N. It should be understood that the examples provided are for illustration purposes only, and therefore should not be construed as limiting in any way.

In an embodiment, the audio source isolation service 152 can execute computer executable instructions on a system, such as the digital headend system 150, so as to monitor and receive the audio source configuration messages 109, 107A, and 107N. In various embodiments, each of the audio source configuration messages 109, 107A, and 107N may include and/or reference the broadcast event identifier 129, although this may not necessarily be the case. To enable the selective presentation of audio content from specific audio sources, the control application 133 and/or the audio source isolation service 152 can create and provide a custom audio source map specifically based on a corresponding instance of an audio source configuration message (e.g., a custom audio source map 154 based on the audio source configuration message 109). To create an instance of a custom audio source map (e.g., the custom audio source maps 154, 157A, and/or 157N), the control application 133 and/or the audio source isolation service 152 may analyze the one or more instances of audio source identifiers that are included in a received audio source configuration message. For example, in an embodiment, the audio source configuration message 109 may include the audio source identifiers 123A and 123B based on input from the user 108. The control application 133 and/or the audio source isolation service 152 can analyze the audio source identifiers 123A, 123B and determine that the audio source identifiers 123A, 123B correspond with the master audio source map 160. The control application 133 and/or the audio source isolation service 152 can access the master audio source map 160 stored in a memory storage device of the operating environment 100. The control application 133 and/or the audio source isolation service 152 can determine which instances of the audio isolation tag definitions 162A-162N correspond with the audio source identifiers 123A, 123B. It is understood that the control application 133 and/or the audio source isolation service 152 can identify and determine which of the particular instances of audio isolation tag definitions should be retrieved based on the particular audio source identifiers included in an instance of an audio source configuration message (e.g., any of the audio source configuration messages 109, 107A, 107N). For example, the control application 133 and/or the audio source isolation service 152 can determine that the audio isolation tag definitions 162A and 162B correspond with the audio source identifiers 123A and 123B from the audio source configuration message 109. Similarly, the control application 133 and/or the audio source isolation service 152 can determine that the audio isolation tag definitions 162A and 162B include the audio isolation tags 142 and 144 so as to inform the media content player 114 that the corresponding packetized audio data sets 140A and 140B have audio content that can be decoded and presented in the same manner as data that includes and/or indicates the fixed protocol value 138. As such, audio output from only the audio sources 122A and 122B can be provided by executing the packetized audio data sets 140A and 140B based on the audio isolation tags 142 and 144 providing the binding that enables individual selection while retaining presentation of audio content in conformance with the protocol profile 137 due to the audio isolation tag definitions 162A and 162B indicating the fixed protocol value 138 (even though the fixed protocol value 138 is not included in the packetized audio data sets 140A-140N). Once the instances of the audio isolation tag definitions are identified, then the control application 133 and/or the audio source isolation service 152 can create an instance of a custom audio source map that can include one or more of instances of the identified audio isolation tag definitions, which may be bundled or otherwise collected together as an audio isolation tag definition set (e.g., one or more of the audio isolation tag definition sets 156, 158, and/or 159).

For example, in some embodiments, the control application 133 and/or the audio source isolation service 152 can create the custom audio source map 154 for the UE 110 based on the audio source configuration message 109. The control application 133 and/or the audio source isolation service 152 can create the audio isolation tag definition set 156 within the custom audio source map 154, where the audio isolation tag definition set 156 includes the audio isolation tag definitions 162A and 162B based on the audio source identifiers 123A and 123B from the audio source configuration message 109. Similarly, the control application 133 and/or the audio source isolation service 152 can create the custom audio source maps 157A, 157N for the subscribing clients 106A, 106N based on the audio source configuration messages 107A, 107N, respectively. The custom audio source maps 157A, 157N can include the audio isolation tag definition sets 158, 159, respectively, that have one or more instances of the audio isolation tag definitions 162A-162N based on one or more of the audio source identifiers 123A-123N included in the audio source configuration messages 107A, 107N. In various embodiments, an instance of a custom audio source map (e.g., any of the custom audio source maps 154, 157A, 157N) can configure user equipment (e.g., the UE 110 and/or the subscribing clients 106A, 106N) to identify one or more of the plurality of packetized audio data sets corresponding to the selected audio sources (e.g., one or more of the packetized audio data sets 140A-140N corresponding to the selected audio sources indicated by the one or more audio source identifiers included in an audio source configuration message) based on the custom audio source map (e.g., any of the custom audio source maps 154, 157A, 157N) defining and/or otherwise associating an instance of an audio isolation tag with the selected audio source. As such, an instance of a custom audio source map (e.g., any of the custom audio source maps 154, 157A, 157N) can configure a user equipment (e.g., the UE 110 and/or the subscribing clients 106A, 106N) to present audio output corresponding to the one or more of the plurality of audio sources identified in an audio source configuration message (e.g., via execution of one or more of the packetized audio data sets 140A-140N to present audio output from one or more of the audio sources 122A-122N based on a custom audio source map). For example, the custom audio source map 154 can instruct the UE 110 and/or the media content player 114 to identify and execute the instances of the packetized audio data sets 140A-140N which correspond with the audio isolation tags 142, 144 identified in the audio isolation tag definition set 156 of the custom audio source map 154. Specifically, the UE 110 and/or the media content player 114 can be instructed to use the audio isolation tag definitions 162A and 162B (from the audio isolation tag definition set 156) included in the custom audio source map 154 to identify that the packetized audio data sets 140A and 140B provide audio content and should be executed to present audio output from the audio sources 122A and 122B. In some embodiments, the custom audio source map 154 can point the media content player 114 to the fixed protocol value 138 in order to convey the type of payload type (e.g., audio content) corresponding to the instances of packetized audio data sets for which execution should be initiated for audio output presentation (e.g., the packetized audio data sets 140A and 140B).

In some embodiments, an instance of a custom audio source map (e.g., any of the custom audio source maps 154, 157A, 157N) may include only instances of audio isolation tag definitions that correspond with audio sources authorized to present audio output, and therefore a custom audio source map may not include an audio isolation tag definition corresponding to audio sources that are not authorized to present audio output. Stated differently, an instance of a custom audio source map (e.g., any of the custom audio source maps 154, 157A, 157N) can be configured to enable selective execution of one or more of the packetized audio data sets 140A-140N by including only those instances of the audio isolation tag definitions 162A-162N that are associated with an audio source identifier included and/or indicated in an audio source configuration message. By this, the custom audio source map 154 can enable a user equipment to selectively suppress execution of the instances of packetized audio data sets corresponding with audio sources that are not authorized or otherwise permitted to present audio output to a user. For example, the UE 110 and/or the media content player 114 can receive the custom audio source map 154 that does not include the audio isolation tag definition 162N that corresponds with the packetized audio data set 140N, the audio isolation tag 146, the audio source identifier 123N, and the audio source 122N. The custom audio source map 154 can instruct the media content player 114 to present audio output via execution of the packetized audio data sets 140A and 140B (corresponding with the audio sources 122A and 122B authorized to present audio output), but suppress, pause, or otherwise halt execution of the packetized audio data set 140N such that presentation of audio output corresponding to the audio source 122N (which was not selected or otherwise authorized for presentation) is ceased, halted, or otherwise does not occur.

In some embodiments, a user (e.g., the user 108) may access the audio source customization interface 202 more than once so as to modify, alter, update, or otherwise reconfigure which of the audio sources 122A-122N are allowed to present audio output on a customer device (e.g., any of the UE 110 and/or the subscribing clients 106A, 106N). As such, another instance of an audio source configuration message (e.g., the audio source configuration message 109) may be sent to the control application 133 and/or the audio source isolation service 152 so that another custom audio source map (e.g., the custom audio source map 154) and/or another audio isolation tag definition set (e.g., the audio isolation tag definition set 156) can be provided, where the another audio isolation tag definition set can include a different set (i.e., combination) of audio isolation tag definitions than what was previously sent to the device. It should be understood that the examples provided are for illustration purposes only, and therefore should not be construed as limiting in any way.

In some embodiments, an instance of a custom audio source map (e.g., the custom audio source map 154) can include a switch instruction 178 that commands an instance of the media content player 114 to switch to, and execute, an instance of the combined audio source data set 148. For example, in some embodiments, the media broadcast event 120 include messages from a sponsor and/or include other "filler" audio content (e.g., a commercial, a half-time show, or other material not from the audio sources 122A-122N) that is (a)periodically provided during broadcast of the media broadcast event 120. In some embodiments, the switch instruction 178 can command the media content player 114 to execute and present the combined audio source data set 148 for a defined period of time (e.g., a time coinciding with a message from a sponsor, half-time show, commercial audio content, etc.), and then switch back to presentation of the authorized audio sources by ceasing execution of the combined audio source data set 148 after the defined period of time elapses so as to continue presentation of audio output corresponding with the audio sources that are selected and authorized. It should be understood that the examples provided are for illustration purposes only, and therefore should not be construed as limiting in any way.

FIG. 1 illustrates one instance of the network 102, the network access point 103, the control network 104, the authorized streaming location 105, the subscribing client 106A, the subscribing client 106N, the audio source configuration message 107A, the audio source configuration message 107N, the user 108, the audio source configuration message 109, the UE 110, the display 111, the processor 112, the memory 113, the media content player 114, the media broadcast event 120, the audio sources 122A-122N, the audio source identifiers 123A-123N, the audio capture devices 124A-124N, the raw audio streams 126A-126N, the raw video stream 127, the broadcast event profile 128, the broadcast event identifier 129, the control system 130, the processor 131, the memory 132, the control application 133, the premixer 134, the packetizer 135, the aggregator 136, the protocol profile 137, the fixed protocol value 138, the undefined protocol value index 139, the packetized audio data sets 140A-140N, the combined audio source data set 148, the audio isolation tags 142, 144, 146, the digital headend system 150, the audio source isolation service 152, the custom audio source map 154, the audio isolation tag definition set 156, the custom audio source maps 157A-157N, the audio isolation tag definition set 158, the audio isolation tag definition set 159, the master audio source map 160, the audio isolation tag definitions 162A-162N, the assembled media stream 170, the packetized audio set streams 172A-172N, the combined audio source stream 174, the video data stream 176, the switch instruction 178, and the audio source selection interface package 180. It should be understood, however, that some implementations of the operating environment 100 can include zero, one, or more than one instances of any of these elements of the operating environment 100 shown in FIG. 1. As such, the illustrated embodiment of the operating environment 100 should be understood as being illustrative and should not be construed as being limiting in any way.

Turning now to FIGS. 2A and 2B with continued reference to FIG. 1, a screen display 200 and a screen display 250 for enabling presentation of audio content from specific audio sources is provided, according to various embodiments. In an embodiment, FIG. 2A shows an instance of the UE 110 executing the media content player 114 so as to present an audio source customization interface, such as the audio source customization interface 202, via the display 111. In some embodiments, the audio source customization interface 202 may be presented based on execution of an instance of the audio source selection interface package 180. In some embodiments, the audio source customization interface 202 can include an assembled media stream presentation 204 that can provide audio output and/or video output based on execution of one or more instances of the packetized audio data sets 140A-140N, the combined audio source data set 148, and/or the video data stream 176. In some embodiments, the media stream presentation 204 may provide audio output corresponding to one or more of the audio sources 122A-122N subsequent to the UE 110 receiving the custom audio source map 154. In some embodiments, the audio source customization interface 202 can include one or more selectable user input objects, such as an audio source customization button 206. In some embodiments, when the user 108 provides input that selects or otherwise corresponds with the audio source customization button 206, the instance of the audio source customization interface 202 can be reconfigured so as to present one or more audio source customization options that allows for selection of audio sources permitted to present audio output, such as shown in FIG. 2B.

In an embodiment, FIG. 2B shows an instance of the audio source customization interface 202 that is presented on the display 111 of the UE 110 while the media content player 114 is executing. In an embodiment, the audio source customization interface 202 can provide one or more audio source isolation buttons that each corresponds with a particular audio source such that selection and/or toggling of one of the audio source isolation buttons can indicate whether or not an audio source is authorized or otherwise permitted to present audio output. For example, the audio source customization interface 202 shown in FIG. 2B can include an audio source isolation button 208 corresponding to the audio source 122A, an audio source isolation button 210 corresponding to the audio source 122B, and an audio source isolation button 212 corresponding to the audio source 122N. In the embodiment shown in FIGS. 2A and 2B, the audio sources 122A-122N of the media broadcast event 120 may provide audio output that corresponds with a professional sporting event (e.g., baseball, football, hockey, basketball, tennis, golf, etc.), however it is understood that this may not necessarily be the case for every embodiment. As shown in FIG. 2B, the audio source isolation buttons 208, 210, and 212 can correspond with audio content that respectively provides field level audio output (i.e., audio output from an audio source at the field level of the sporting event, such as players, coaches, cheerleaders, etc.), color commentary audio output (i.e., audio output from professional commentators providing explanation and/or discussion of the sporting event), and stadium background audio output (i.e., audio output that from attendees of the sporting event who are located in a stadium or other location where the sporting event occurs). In various embodiments, each of the audio source isolation buttons 208, 210, 212 can be an interactive user interface object that is configured to receive input, where input from the user 108 that selects or otherwise toggles one of the audio source isolation buttons 208, 210, 212 indicates a selection of a corresponding audio source and authorization and/or permission for the media content player 114 to selectively execute one or more of the packetized audio data sets 140A-140N so as to present audio output from the one or more selected audio sources.

For example, in the embodiment shown in FIG. 2B, the user 108 provides input that selects or otherwise toggles the audio source isolation buttons 208 and 212 so as to indicate that audio output from the field level and audio output from the stadium background should be presented, which in this example corresponds with the audio sources 122A and 122N respectively. Based on the input provided by the user 108 to indicate selection of one or more audio sources (e.g., input that indicates selection of the audio source isolation buttons 208 and 212), the audio source selection interface package 180 can instruct the UE 110 to determine which of the audio source identifiers 123A-123N corresponds with selected buttons. In this example, because the audio source isolation buttons 208 and 212 are selected, the user 108 authorizes audio output from the audio sources 122A and 122N, which correspond with the audio source identifiers 123A and 123N. Therefore, based on the input from the user 108, the UE 110 can be instructed to create an instance of the audio source configuration message 109 that includes the audio source identifiers 123A and 123N so as to indicate that the audio sources 122A and 122N are permitted to present audio output on the UE 110. The audio source configuration message 109 may not include the audio source identifier 123B that is associated with the audio source 122B because the user 108 did not select or otherwise toggle the audio source isolation button 210, thereby indicating that the audio source 122B (e.g., color commentary) is not authorized or permitted to provide and present audio output on the UE 110.

In various embodiments, the audio source configuration message 109 can be sent to a system, an application, and/or a service of the operating environment 100 (e.g., the control system 130, the digital headend system 150, the control application 133, and/or the audio source isolation service 152). The audio source configuration message 109 can be configured to request creation of a custom audio source map based on the user input, such as an instance of the custom audio source map 154 that includes an instance of the audio isolation tag definition set 156 that is configured to include the audio isolation tag definitions 162A and 162N based on the audio source configuration message 109 having the audio source identifiers 123A and 123N, according to an embodiment. In this example, the UE 110 can receive an instance of the custom audio source map 154 in response to providing the audio source configuration message 109, where the custom audio source map 154 can instruct the media content player 114 to execute the packetized audio data sets 140A and 140N that have the audio isolation tags 142 and 146, respectively, based on the audio source configuration message 109 that indicated authorization to provide audio output from the audio sources 122A and 122N. It should be understood that the examples provided are for illustration purposes only, and therefore should not be construed as limiting in any way.

In some embodiments, an instance of the audio source customization interface 202 can provide and present one or more instance of a volume modification object that configures audio output from a specific audio source to be adjusted and set prior to a corresponding packetized audio data set being executed to present audio output. For example, in an embodiment, a volume modification object 214 can be associated with the audio source isolation button 208, the audio source identifier 123A, and therefore also the audio source 122A. In some embodiments, a volume modification object 216 can be associated with the audio source isolation button 210, the audio source identifier 123B, and therefore also the audio source 122B. In some embodiments, a volume modification object 218 can be associated with the audio source isolation button 212, the audio source identifier 123N, and therefore also the audio source 122N. In various embodiments, when the user 108 provides input that authorizes audio output from the audio sources 122A and 122N via selection of the audio source isolation buttons 208 and 212, the audio source customization interface 202 can be configured to enable the user 108 to adjust the volume (e.g., audio output measured in decibels) of the corresponding audio sources 122A and 122N by configuring the volume modification objects 214 and 218. In the embodiment shown in FIG. 2B, the volume modification object 214 may be configured to provide maximum volume (e.g., indicated by "100%") and the volume modification object 218 may be configured by the user 108 to provide an intermediate volume level (e.g., indicated by "50%"). In some embodiments, the volume modification object 218 may be automatically muted or otherwise configured at a zero level (e.g., indicated by "0%") so as to indicate that no audio output from the audio source 122B will be presented because the user 108 did not provide input to authorize audio output from the audio source 122B, as shown in FIG. 2B by the audio source isolation button 210 not being selected or otherwise toggled. In various embodiments, the volume modification objects 214, 216, and 218 can instruct the media content player 114 that if audio output is to be presented from a corresponding audio source, then the corresponding packetized audio data sets (e.g., the packetized audio data sets 140A and 140N) should be executed such that presentation of the audio output corresponds with a volume level set by the corresponding volume modification objects (e.g., the volume modification objects 214 and 218). It should be understood that the examples provided are for illustration purposes only, and therefore should not be construed as limiting in any way.

FIGS. 2A and 2B illustrate one instance of the user 108, the UE 110, the display 111, the media content player 114, the audio source customization interface 202, the assembled media stream presentation 204, the audio source customization button 206, the audio source identifier 123A, the audio source identifier 123B, the audio source identifier 123N, the audio source isolation button 208, the audio source isolation button 210, the audio source isolation button 212, the volume modification object 214, the volume modification object 216, and the volume modification object 218. It should be understood, however, that some implementations of the screen display 200 and the screen display 250 can include zero, one, or more than one instances of any of these elements of the screen display 200 and the screen display 250 shown in FIGS. 2A and 2B. As such, the illustrated embodiment of the screen display 200 and the screen display 250 should be understood as being illustrative and should not be construed as being limiting in any way.

Figure 3:
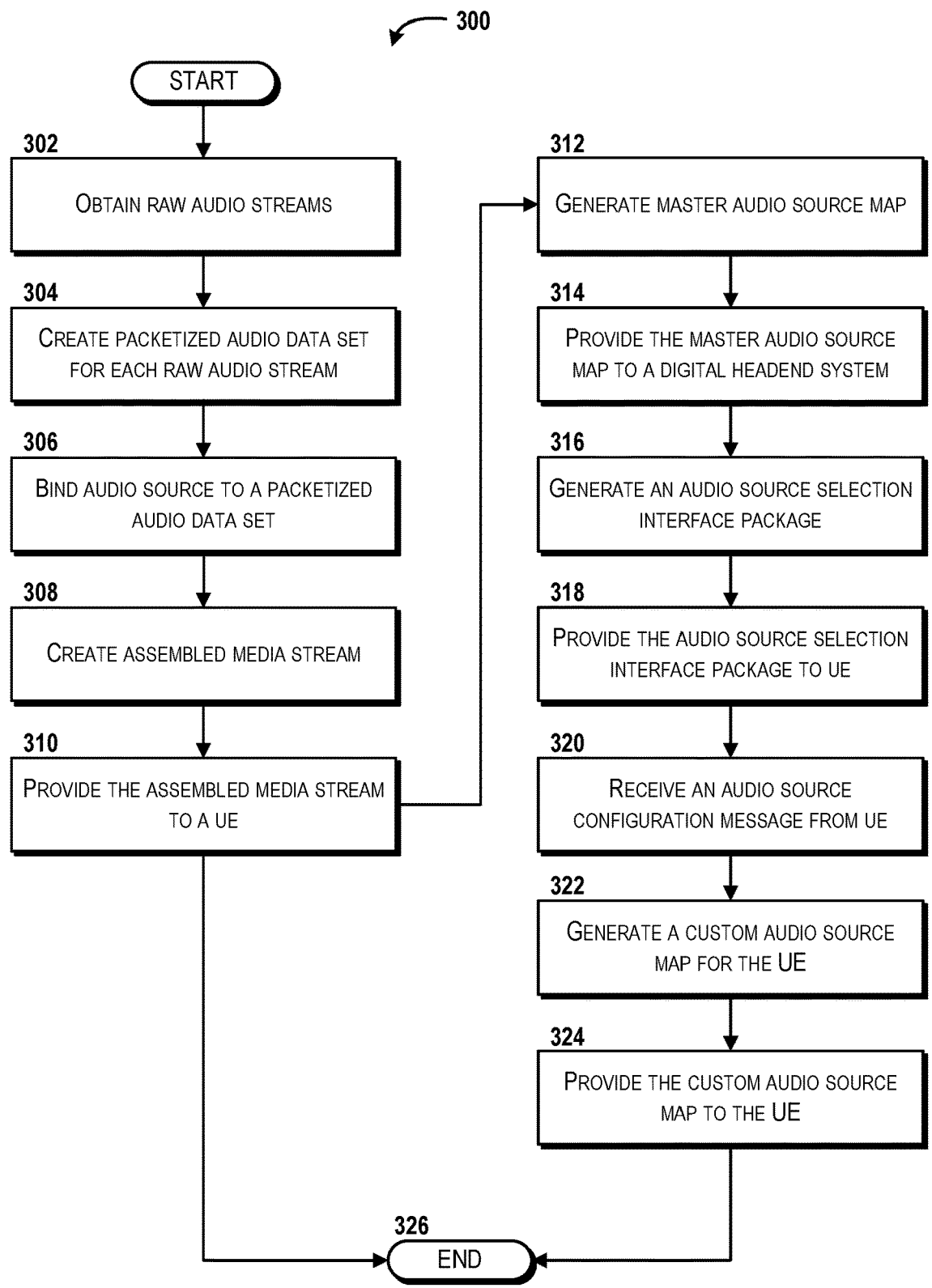
FIG. 3 is a flow diagram illustrating aspects of a method of network broadcasting for selective presentation of audio content, according to an illustrative embodiment.

Turning now to FIGS. 3, 4A, and 4B with continued reference to FIG. 1, aspects of a method 300, a method 400, and a method 430 for embodiments related to network broadcasting for selective presentation of audio content will be described in detail, according to an illustrative embodiment. It should be understood that each of the operations of the one or more methods disclosed herein (e.g., the methods 300, 400, and 430 discussed below) are not necessarily presented in any particular order and that performance of some or all of the operations in an alternative order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The term "computer-readable instructions," and variants thereof, as used herein, is used expansively to include routines, applications, application modules, program modules, programs, components, data structures, algorithms, and the like. It is understood that use of the term "module" refers to a defined, callable set of computer-readable instructions that provide the performance of one or more operations and functions discussed herein so as to transform, upon execution, processing resources and/or memory resources into a particular, non-generic, machine. Computer-readable instructions can be implemented on various system configurations including single-processor or multiprocessor systems, minicomputers, user equipment, mainframe computers, personal computers, network servers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing and transforming a processor of a computing system or device, such as any component within the control system 130 (e.g., the premixer 134, the packetizer 135, the control application 133, the aggregator 136), the network 102, the control network 104, the digital headend system 150, the subscribing clients 106A, 106N, and/or the UE 110, to perform one or more operations and/or causing the processor to direct other components of the computing system or device to perform one or more of the operations.

For purposes of illustrating and describing the concepts of the present disclosure, the operations of methods disclosed herein are described as being performed by at least the control system 130 and/or the digital headend system 150 via execution of one or more software modules (i.e., where software modules refers to computer-executable instructions configured as data that can instruct and transform a processor) such as, for example without limitation, the control application 133, the premixer 134, the packetizer 135, and the aggregator 136 that configure one or more processor, such as the processor 131 of the control system 130 and/or a processor of the digital headend system 150. It should be understood that additional and/or alternative devices and/or network elements can, in some embodiments, provide the functionality described herein via execution of one or more modules, applications, and/or other software including, but not limited to, the other instances of a media content player 114 on a UE (e.g., the UE 110). Thus, the illustrated embodiments are illustrative, and should not be viewed as being limiting in any way. The methods 300, 400, and 430 will be described with reference to one or more of the FIGS. 1, 2, 3, 4A, and 4B.

Turning now to FIG. 3, the method 300 directed to network broadcasting for selective presentation of audio content is disclosed, according to an embodiment. In some embodiments, the method 300 may be performed by one or more aspects of the control system 130 and/or the digital headend system 150, such as but not limited to a processor 131, a memory 132, a control application 133, a premixer 134, a packetizer 135, an aggregator 136, and/or an audio source isolation service 152. It should be understood that the examples provided are for illustration purposes only, and therefore should not be construed as limiting in any way.

In some embodiments, the method 300 can begin at operation 302, where the control system 130 can execute within the network 102 and/or the control network 104 and obtain a plurality of raw audio streams created by a plurality of audio capture devices, where each of the plurality of raw audio streams capture audio output from an audio source of a plurality of audio sources. For example, the control system 130 can obtain the raw audio streams 126A-126N created by the audio capture devices 124A-124N, respectively. Each of the raw audio streams 126A-126N capture audio output that was provided by the audio sources 122A-122N, respectively. The raw audio streams 126A-126N can be received by the control system 130 directly from the audio capture devices 124A-124N, respectively, and/or via a network, such as the network 102 and/or the control network 104.

From operation 302, the method 300 can proceed to operation 304, where the control system 130 can create a packetized audio data set for each of the plurality of raw audio streams such that a plurality of packetized audio data sets are created. For example, the control system 130 can create the packetized audio data set 140A based on the raw audio stream 126A, the packetized audio data set 140B based on the raw audio stream 126B, and the packetized audio data set 140N based on the raw audio stream 126N.

From operation 304, the method 300 can proceed to operation 306, where the control system 130 can bind each audio source from the plurality of audio sources to one of the plurality of packetized audio data sets via a plurality of audio isolation tags such that execution of each packetized audio data set can be individually initiated and individually suppressed. For example, the control system 130 can create the audio isolation tags 142, 144, and 146 for the packetized audio data sets 140A, 140B, and 140N, respectively. The audio isolation tags 142, 144, and 146 can enable the media content player 114 of the UE 110 to select and individually execute one or more of the packetized audio data sets 140A, 140B, and 140N based on input from a user. The audio isolation tags 142, 144, and 146 also can suppress execution and presentation of audio output from audio sources corresponding to a packetized audio data set that is not selected. In some embodiments, the audio isolation tags 142, 144, and 146 can be decoded and interpreted by the media content player 114 via a custom audio source map, which is discussed below in further detail.

From operation 306, the method 300 can proceed to operation 308, where the control system 130 can create an assembled media stream that includes the plurality of packetized audio data sets. For example, in some embodiments, the control system 130 can create the assembled media stream 170 that includes the packetized audio data sets 140A-140N. In some embodiments, the assembled media stream 170 can include the combined audio source data set 148. In some embodiments, the assembled media stream 170 can include a collection and/or bundle of one or more content streams, such as but not limited to the packetized audio set streams 172A-172N, the combined audio source stream 174, and/or the video data stream 176. In some embodiments, the assembled media stream 170 can include the broadcast event identifier 129. In some embodiments, the assembled media stream 170 is configured so as to instruct the UE 110 and/or the media content player 114 to execute the combined audio source data set 148 (which may be sent as the combined audio source stream 174) based on the combined audio source data set 148 having or otherwise indicating the fixed protocol value 138. When the media content player 114 determines that a data packet (e.g., data packets of the combined audio source data set 148) includes and/or corresponds with the fixed protocol value 138, then the media content player 114 understands that the fixed protocol value 138 represents audio content, thereby causing the media content player 114 to present audio output based on the combined audio source data set 148. Because the packetized audio data sets 140A-140N include instances of an audio isolation tag (e.g., the audio isolation tags 142, 144, 146, respectively) instead of the fixed protocol value 138, the media content player 114 may be instructed to obtain an instance of a custom audio source map (e.g., the custom audio source map 154) prior to initiating execution of the packetized audio data sets 140A-140N. Thus, when the media content player 114 determines that the fixed protocol value 138 is not present within the packetized audio data sets 140A-140N, the assembled media stream 170 can instruct the UE 110 and/or the media content player 114 to present the audio source customization interface 202 so as to generate an audio source configuration message 109 and obtain the custom audio source map 154.

From operation 308, the method 300 can proceed to operation 310, where the control system 130 can provide the assembled media stream 170 to a user equipment (e.g., the UE 110 and/or the subscribing clients 106A-106N). In some embodiments, the assembled media stream 170 may be pushed to a user device (e.g., the UE 110) and/or delivered on-demand. In some embodiments, the assembled media stream 170 may be provided to the UE 110 as part of a network service offered to subscribers of a communications service provider. In some embodiments, the method 300 may proceed from operation 310 to operation 326, where the method 300 may end.

In some embodiments, the method 300 may proceed from operation 310 to operation 312, where the control system 130 can generate a master audio source map that includes the plurality of audio isolation tags that bind the plurality of packetized audio data sets to the plurality of audio sources. For example, the control system 130 can generate the master audio source map 160 that includes the plurality of audio isolation tags 142, 144, and 146 that bind the packetized audio data sets 140A-140N to the audio sources 122A-122N. In some embodiments, the audio isolation tags 142, 144, and 146 can each correspond with an instance of an audio isolation tag definition (e.g., the audio isolation tag definitions 162A-162N, respectively) so as to instruct the UE 110 and/or the media content player 114 which audio isolation tag corresponds with a particular audio source. For example, in various embodiments, if the media content player 114 were to analyze an instance of an audio isolation tag (e.g., any of the audio isolation tags 142, 144, 146), then the media content player 114 will recognize that the audio isolation tags 142, 144, 146 do not provide the fixed protocol value 138, specifically because each of the audio isolation tags 142, 144, 146 were created to provide an undefined protocol value from the undefined protocol value index 139 so as to enable distinction, isolation, and selection of a specific packetized audio data set for audio output corresponding to a selected audio source. As such, the audio isolation tag definitions 162A-162N can allow the UE 110 and/or the media content player 114 to determine which audio source identifiers and audio isolation tags are associated with each other (e.g., the audio source identifiers 123A-123N being associated with the audio isolation tags 142, 144, and 146, respectively). Each of the audio isolation tag definitions 162A-162N can also provide, reference, direct, and/or point the media content player 114 to the fixed protocol value 138 so that the media content player 114 can determine that the corresponding packetized audio data set (e.g., one of the packetized audio data sets 140A-140N) pertains to audio content (as opposed to video content or other data type), which in turn can cause the media content player 114 to execute and present audio output from a specific audio source.

In some embodiments, from operation 312, the method 300 can proceed to operation 314, where the control system 130 can provide the master audio source map 160 to the digital headend system 150. In some embodiments, the digital headend system 150 can be configured to host or otherwise support the audio source isolation service 152 that can facilitate or otherwise provide the creation of one or more instances of a custom audio source map (e.g., any of the custom audio source maps 154, 157A, 157N). In some embodiments, the digital headend system 150 may store the master audio source map 160 in one or more memory storage devices that are accessible via the network 102 and/or the control network 104.

From operation 314, the method 300 can proceed to operation 316, where the control system 130 can generate instances of an audio source selection interface package that instructs a user equipment to present an audio source customization interface. For example, the control system 130 can generate instances of the audio source selection interface package 180 for each instance of user equipment (e.g., one or more of the UE 110 and/or the subscribing clients 106A-106N) that is provided the assembled media stream 170. The audio source selection interface package 180 can include instances of the audio source identifiers 123A-123N that can be provided within an audio source configuration message (e.g., any of the audio source configuration messages 109, 107A, and 107N). The audio source selection interface package 180 can instruct a user equipment (e.g., one or more of the UE 110 and/or the subscribing clients 106A-106N) to generate an instance of an audio source customization interface (e.g., instances of the audio source customization interface 202 shown in FIGS. 2A and 2B). The audio source customization interface 202 can be configured to generate an instance of an audio source configuration message (e.g., any of the audio source configuration messages 109, 107A, and 107N) in response to input from a user, where the input selects audio sources so as to indicate and authorizes presentation of audio output from the audio sources selected. The audio source selection interface package 180 can instruct the user equipment (e.g., one or more of the UE 110 and/or the subscribing clients 106A-106N) to include one or more audio source identifiers (e.g., the audio source identifiers 123A-123N) based on the audio sources selected or otherwise authorized to present audio output via the audio source customization interface 202.

From operation 316, the method 300 can proceed to operation 318, where the control system 130 can provide the audio source selection interface package 180 to an instance of user equipment (e.g., one or more of the UE 110 and/or the subscribing clients 106A-106N). In various embodiments, each instance of the user equipment may receive the same audio source selection interface package 180 and/or the assembled media stream 170. However, each audio source selection interface package 180 can cause an instance of a user equipment (e.g., one or more of the UE 110 and/or the subscribing clients 106A-106N) to receive a custom audio source map (e.g., the custom audio source maps 154, 157A, 157N) that is based on input from a user that is indicated via a custom audio source configuration message from the corresponding user equipment.

From operation 318, the method 300 can proceed to operation 320, where the control system 130 and/or the digital headend system 150 may receive an audio source configuration message from a user equipment, where the audio source configuration message can identify one or more of the plurality of audio sources based on input from a user. For example, the control system 130 and/or the digital headend system 150 may receive one or more of the audio source configuration message 109 from the UE 110 and/or the audio source configuration messages 107A and 107N from the subscribing clients 106A and 106N, respectively. Each of the audio source configuration messages 107A, 107N, and 109 may be configured to include audio source identifiers (e.g., any of the audio source identifiers 123A-123N) based on the input from the user that indicates which of the audio sources 122A-122N are permitted or otherwise authorized to provide audio output on the user equipment (e.g., the UE 110 and/or the subscribing clients 106A, 106N).

From operation 320, the method 300 can proceed to operation 322, where the control system 130 and/or the digital headend system 150 can generate a custom audio source map for a user equipment based on a corresponding audio source configuration message. For example, the control system 130 and/or the digital headend system 150 can generate the custom audio source map 154 based on the one or more audio source identifiers 123A-123N included in the audio source configuration message 109 so as to indicate which of the audio sources 122A-122N are authorized to present audio output. Similarly, the custom audio source maps 157A and 157N can be created based on the audio source configuration messages 107A and 107N, respectively. The custom audio source map 154 can include the audio isolation tag definition set 156 that provides one or more instances of the audio isolation tag definitions 162A-162N based on the audio source identifiers 123A-123N from the audio source configuration message 109. The media content player 114 can use the audio isolation tag definitions 162A-162N included in the custom audio source map 154 to identify and execute the packetized audio data sets that have audio isolation tags associated with the audio source identifiers. For example, if the audio sources 122A and 122B were selected and authorized for audio output, then the media content player 114 can use the custom audio source map 154 to determine that the audio sources 122A and 122B correspond with the packetized audio data sets 140A and 140B that include the audio isolation tags 142 and 144, as indicated by the audio isolation tag definitions 162A and 162B which define or otherwise indicate the association between the audio isolation tags 142, 144 and the audio source identifiers 123A, 123B, respectively. The audio isolation tag definitions 162A and 162B also can instruct the media content player 114 that the packetized audio data sets 140A and 140B pertain to audio content, and therefore the media content player 114 can decode and execute the packetized audio data sets 140A, 140B using a standard protocol provided by the fixed protocol value 138 that is associated with the presentation of audio content (despite the packetized audio data sets 140A, 140B not providing the fixed protocol value 138). By this, only the authorized audio sources are permitted to present audio output via execution of the packetized audio data sets 140A, 140B associated with the audio isolation tag definitions 162A and 162B.

From operation 322, the method 300 can proceed to operation 324, where the control system 130 and/or the digital headend system 150 can provide an instance of a custom audio source map to a corresponding user equipment. For example, the control system 130 and/or the digital headend system 150 can provide the custom audio source map 154 to the UE 110, the custom audio source map 157A to the subscribing client 106A, and the custom audio source map 157N to the subscribing client 106N. In various embodiments, each of the custom audio source maps 154, 157A, and 157N can configure the corresponding user equipment (e.g., the UE 110, the subscribing client 106A, and the subscribing client 106N, respectively) to present audio output corresponding to the one or more audio sources identified or otherwise associated with the audio source configuration messages 109, 107A, and 107N, respectively.

From operation 324, the method 300 can proceed to operation 326, where the method 300 can end.

Turning now to FIG. 4A, the method 400 for generation of a master audio source map that supports selective presentation of audio content is disclosed, according to an embodiment. In some embodiments, the method 400 may be performed by one or more aspects of the control system 130 and/or the digital headend system 150, such as but not limited to the processor 131, the memory 132, the control application 133, the premixer 134, the packetizer 135, the aggregator 136, and/or the audio source isolation service 152. It should be understood that the examples provided are for illustration purposes only, and therefore should not be construed as limiting in any way.

In some embodiments, the method 400 can begin at operation 402, where the control system 130 may execute the control application 133 to determine audio source identifiers associated with the media broadcast event 120. For example, the control system 130 may determine that the audio source identifiers 123A-123N can be used to identify the audio sources 122A-122N associated with the media broadcast event 120.

From operation 402, the method 400 can proceed to operation 404, where the control system 130 can assign one of the audio source identifiers 123A-123N to each of the raw audio streams 126A-126N. For example, the raw audio stream 126A can be assigned the audio source identifier 123A based on the raw audio stream 126A being created by capturing audio output from the audio source 122A. The raw audio stream 126B can be assigned the audio source identifier 123B based on the raw audio stream 126B being created by capturing audio output from the audio source 122B. The raw audio stream 126N can be assigned the audio source identifier 123N based on the raw audio stream 126N being created by capturing audio output from the audio source 122N.

From operation 404, the method 400 can proceed to operation 406, where the control system 130 can access the protocol profile 137 that is associated with providing and presenting audio content on the UE 110. For example, the protocol profile 137 can conform and/or define a standard protocol by which to deliver and encode audio data packets to enable presentation of audio content on the UE 110. In some embodiments, the protocol profile 137 may provide a standard protocol, such as the RTP. In some embodiments, the protocol profile 137 can include the fixed protocol value 138 that is used to indicate that data has a payload type of audio content without indication or designation of audio source. In some embodiments, the control system 130 can identify one or more undefined protocol values from the undefined protocol value index 139 that can be used to create one or more audio isolation tags to enable audio source selection and selective presentation.

From operation 406, the method 400 can proceed to operation 408, where the control system 130 can create one or more instances of an audio isolation tag that enables selective audio content presentation from a specific audio source. For example, the control system 130 can create the audio isolation tags 142, 144, and 146 that are each configured with a different undefined protocol value from the undefined protocol value index 139. By this, each of the audio isolation tags 142, 144, and 146 can be associated with a specific audio source (e.g., the audio sources 122A-122N, respectively) while also allowing the packetized audio data sets 140A-140N to be configured in a format that conforms with the protocol profile 137.

From operation 408, the method 400 can proceed to operation 410, where the control system 130 can generate the master audio source map 160 associated with the media broadcast event 120. In some embodiments, the master audio source map 160 can include the broadcast event identifier 129 associated with the media broadcast event 120. In some embodiments, the master audio source map 160 can include the plurality of audio isolation tags that are included in the packetized audio data sets 140A-140N, such as the audio isolation tags 142, 144, and 146. The audio isolation tags 142, 144 and 146 may be included in the master audio source map 160 via one or more audio isolation tag definitions, such as the audio isolation tag definitions 162A-162N.

From operation 410, the method 400 can proceed to operation 412, where the control system 130 can create instances of an audio isolation tag definition for the master audio source map 160. For example, for each of the audio isolation tags 142, 144 and 146, the control system 130 may create a corresponding instance of the audio isolation tag definitions 162A, 162B, and 162N. In various embodiments, each instance of an audio isolation tag definition (e.g., the audio isolation tag definitions 162A-162N) can indicate and association between an instance of an audio isolation tag (e.g., the audio isolation tags 142, 144, 146) and an instance of an audio source identifier corresponding to an audio source (e.g., the audio source identifiers 123A, 123B, and 123N, respectively). In some embodiments, each of the audio isolation tag definitions may provide or otherwise point to the fixed protocol value 138 that represents audio content such that the media content player 114 becomes aware that a data packet should be executed according to one or more protocol standards of the protocol profile 137 that is defined and/or associated with the fixed protocol value 138. As such, the audio isolation tag definitions 162A-162N can configure the media content player 114 to execute an instance of a packetized audio data set (e.g., any of the packetized audio data sets 140A-140N) and present audio output even though the corresponding audio isolation tag does not provide the fixed protocol value 138 defined in the protocol profile 137. Instead, the media content player 114 can use one or more of the audio isolation tag definitions 162A-162N to determine that a particular instance of a packetized audio data set should be executed to present audio output because the audio isolation tag included in the packetized audio data set is associated with one of the audio source identifiers 123A-123N for a selected (or otherwise authorized) audio source. The media content player 114 understands that the particular instance of a packetized audio data set should be decoded and executed so as to present audio output (as opposed to video output or another payload type) because the corresponding audio isolation tag definition indicates that the audio data packets of the packetized audio data set pertain to audio content based on the audio isolation tag definition presenting or otherwise pointing or referencing the fixed protocol value 138. Therefore, the audio isolation tags 142, 144, and 146 and the audio isolation tag definitions 162A-162N can be used by the media content player 114 to enable distinction, isolation, and selection of a specific packetized audio data set for audio output corresponding to a selected audio source.

From operation 412, the method 400 can proceed to operation 414, where the control system 130 can store instances of the audio isolation tag definitions 162A-162N in the master audio source map 160. The master audio source map 160 can be configured such that instances of each of the audio isolation tag definitions 162A-162N can be extracted and used to create one or more instances of a custom audio source map based on the corresponding audio source identifiers 123A-123N identified in an audio source configuration message (e.g., any of the audio source configuration messages 109, 107A, and 107N).

From operation 414, the method 400 can proceed to operation 416, where the method 400 may end.

Turning now to FIG. 4B, the method 430 for generation of a custom audio source map that supports selective presentation of audio content is disclosed, according to an embodiment. In some embodiments, the method 430 may be performed by one or more aspects of the control system 130 and/or the digital headend system 150, such as but not limited to a processor 131, a memory 132, a control application 133, and/or an audio source isolation service 152. It should be understood that the examples provided are for illustration purposes only, and therefore should not be construed as limiting in any way.

In some embodiments, the method 430 can begin at operation 432, where a system (e.g., the control system 130 and/or the digital headend system 150) can receive an audio source configuration message, such as the audio source configuration message 109. In some embodiments, the control application 133 and/or the audio source isolation service 152 may receive one or more instances of the audio source configuration message, such as the audio source configuration message 109. The audio source configuration message 109 can be sent from a user device, such as the UE 110.

From operation 432, the method 430 can proceed to operation 434, where the control system 130 and/or the digital headend system 150 can analyze the audio source configuration message 109 and data included therein. For example, the control system 130 and/or the digital headend system 150 can analyze instances of audio source identifiers to determine which master audio source map should be accessed. In some embodiments, the audio source configuration message 109 can include the audio source identifier 123A and 123N corresponding to the audio sources 122A and 122N. As such, the control system 130 and/or the digital headend system 150 may determine that the audio source identifiers 123A and 123N are associated with the media broadcast event 120 corresponding with the master audio source map 160.

From operation 434, the method 430 can proceed to operation 436, where the control system 130 and/or the digital headend system 150 may access the master audio source map 160 that stores one or more instances of audio isolation tag definitions 162A-162N corresponding to the audio isolation tags 142, 144, and 146. In some embodiments, the master audio source map 160 may be stored in a memory associated with the digital headend system 150, the memory 132 associated with the control system 130, or another memory that is communicatively coupled to the network 102 and/or the control network 104.

From operation 436, the method 430 can proceed to operation 438, where the control system 130 and/or the digital headend system 150 can determine which of the one or more instances of audio isolation tag definitions 162A-162N correspond with the audio source identifiers included in the audio source configuration message 109. For example, the control system 130 and/or the digital headend system 150 can determine that the audio isolation tag definitions 162A and 162N include and correspond with the audio source identifiers 123A and 123N. As such, instances of the audio isolation tag definitions 162A and 162N can be retrieved so that the UE 110 can be provided with definitions indicating that the corresponding packetized audio data sets 140A and 140N having the audio isolation tags 142 and 146 should be decoded and executed so as to present audio output from the audio sources 122A and 122N associated with the audio source identifiers 123A and 123N.

From operation 438, the method 430 can proceed to operation 440, where the control system 130 and/or the digital headend system 150 can create the audio isolation tag definition set 156 based on the audio source configuration message 109. For example, the control system 130 and/or the digital headend system 150 can include the audio isolation tag definitions 162A and 162N corresponding to the audio source identifiers 123A and 123N, respectively. The audio isolation tag definitions 162A and 162N can enable the media content player 114 and/or the UE 110 to determine that the packetized audio data sets 140A and 140N correspond with the selected audio sources (e.g., the audio sources 122A and 122N). Therefore, the media content player 114 can use the audio isolation tag definitions 162A and 162N to determine that the packetized audio data sets 140A and 140N that have the audio isolation tags 142 and 146 provide data that should be decoded and executed according to the protocol profile 137 defining a standard protocol for audio content (e.g., the fixed protocol value 138). As such, the audio isolation tag definitions 162A and 162N can enable the UE 110 to selectively present audio output from the audio sources 122A and 122N by selectively executing the packetized audio data sets 140A and 140N.

From operation 440, the method 430 can proceed to operation 442, where the control system 130 and/or the digital headend system 150 can create the custom audio source map 154 and store the audio isolation tag definition set 156 within the custom audio source map 154. The custom audio source map 154 can instruct the UE 110 and/or the media content player 114 to execute the packetized audio data sets 140A and 140N corresponding to the audio isolation tags 142 and 146, respectively. The custom audio source map 154 may also instruct the UE 110 and/or the media content player 114 to suppress execution of the packetized audio data set 140B that has the audio isolation tag 144 because an instance of the audio isolation tag definition 162B was omitted or otherwise not included in the audio isolation tag definition set 156.

From operation 442, the method 430 can proceed to operation 444, where the method 430 may end. It is understood that one or more operations from the method 430 may be proceeded by one or more operations discussed herein. It should be understood that the examples provided are for illustration purposes only, and therefore should not be construed as limiting in any way.

Figure 5:
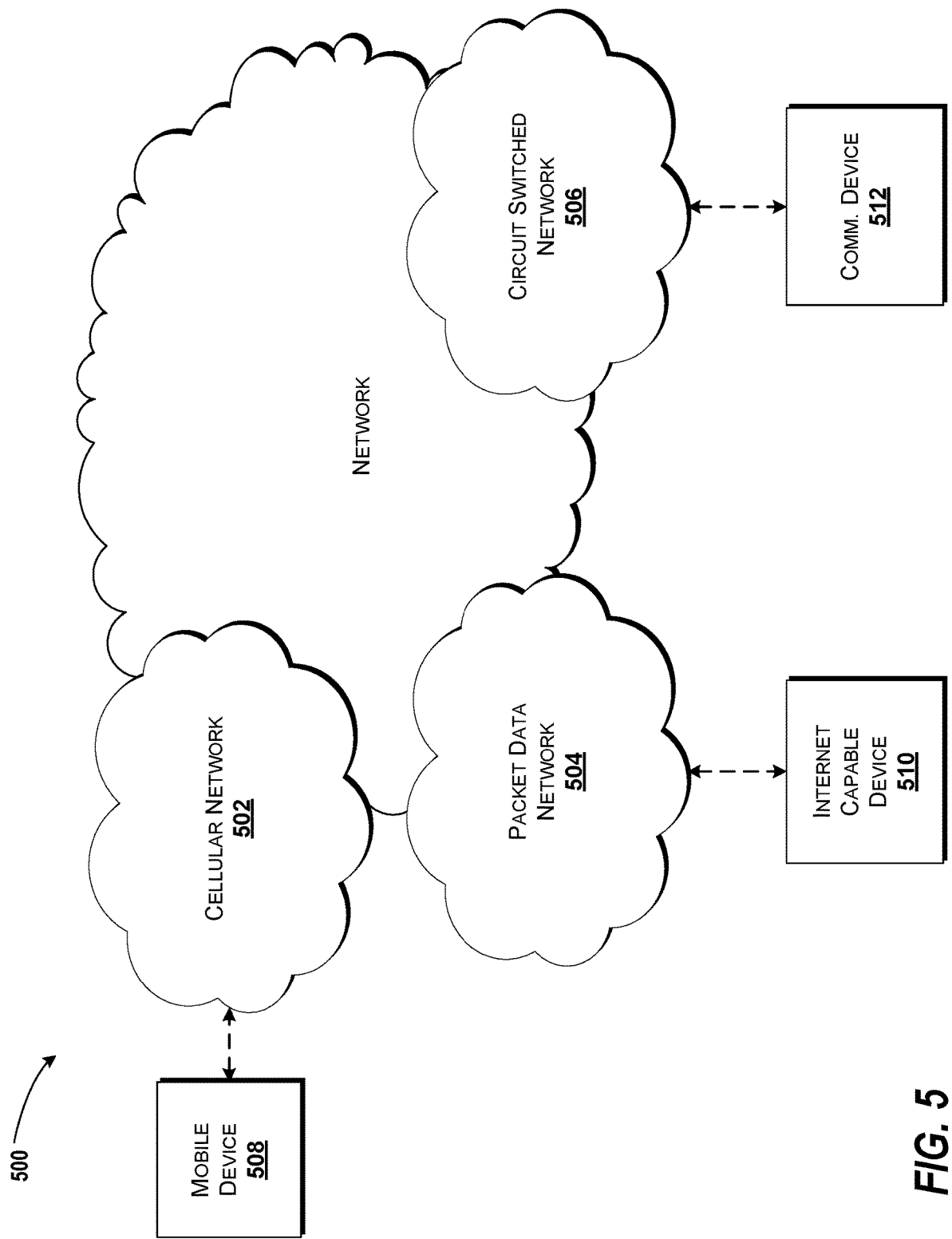
FIG. 5 is a diagram illustrating an example network capable of implementing aspects of the embodiments discussed herein.

Turning now to FIG. 5, a discussion of a network 500 is illustrated, according to an illustrative embodiment. In various embodiments, the network 102 and/or the control network 104 shown in FIG. 1 can be configured substantially similar to include the network 500 and/or at least some of the elements of the network 500. The network 500 can include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also can be compatible with mobile communications standards such as but not limited to 4G, LTE, LTE Advanced, LTE Advanced Pro, and/or 5G New Radio, as well as evolved and future mobile standards.

The packet data network 504 includes various devices, for example, servers, computers, databases, and other devices in communication with one another, as is generally understood. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" and/or "pointers" in the retrieved files, as is generally understood. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In some embodiments, the mobile communications device 508, the Internet-capable device 510, and/or the communication device 512 can correspond with one or more computer systems and/or devices discussed with respect to FIG. 1, such as but not limited to the control system 130, the digital headend system 150, the UE 110, the subscribing client 106A, and/or the subscribing client 106N. In the specification, the network 102, the control network 104, and/or the network 500 can refer broadly to any combination of the networks 502, 504, 506. It should be appreciated that substantially all of the functionality described with reference to the network 102, the control network 104, and/or the network 500 can, in some embodiments, be performed by the cellular network 502, the packet data network 504, and/or the circuit switched network 506, alone or in combination with other networks, network elements, and the like.

Figure 6:
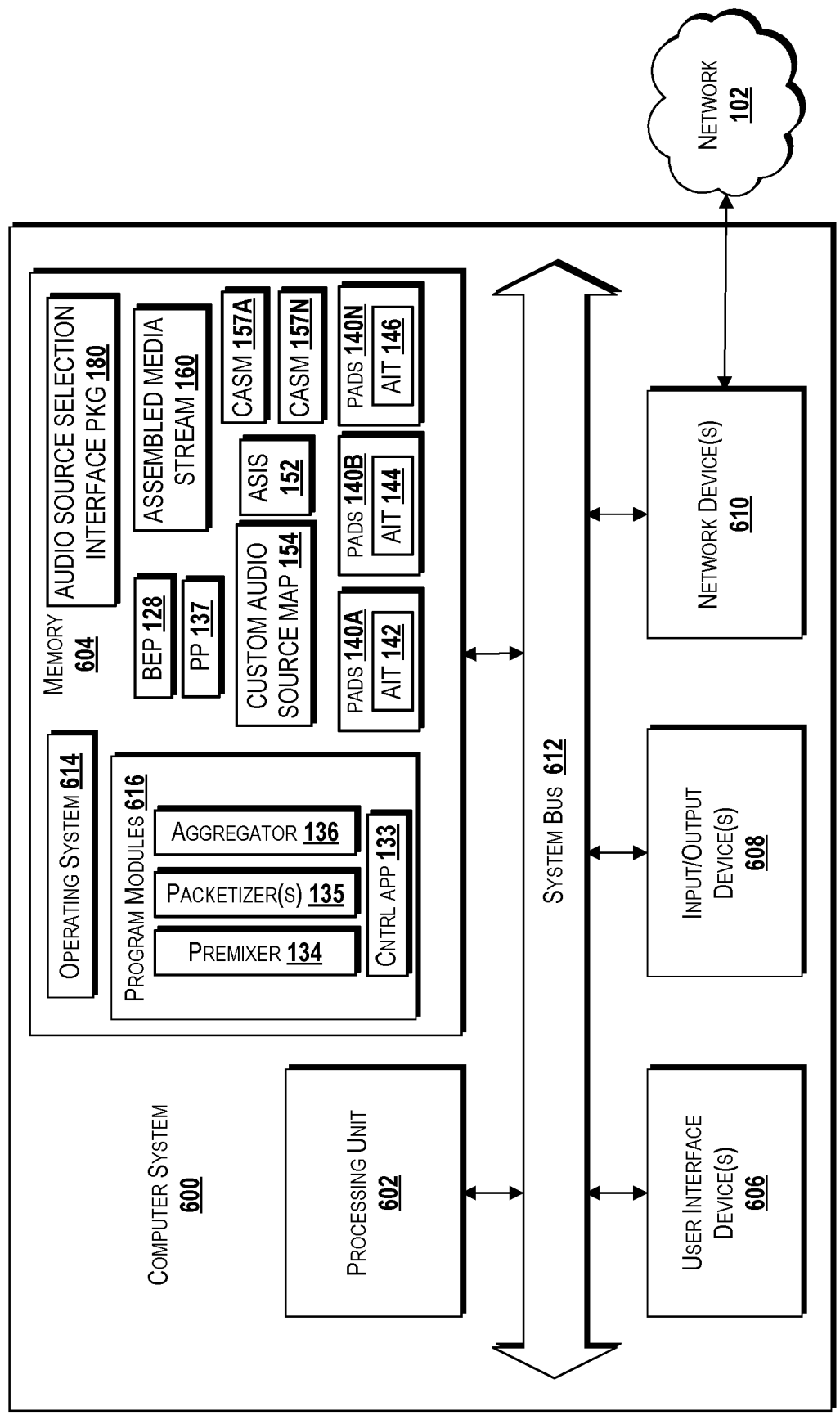
FIG. 6 is a block diagram illustrating an example computer system capable of implementing aspects of the embodiments presented and described herein.

FIG. 6 is a block diagram illustrating a computer system 600 configured to provide the functionality described herein for selective presentation of audio content, in accordance with various embodiments of the concepts and technologies disclosed herein. In aspects, the audio capture device 124A, the audio capture device 124B, the audio capture device 124N, the control system 130, the digital headend system 150, the network access point 103, the subscribing client 106A, and/or the subscribing client 106N illustrated and described herein can be configured as and/or can have an architecture similar or identical to the computer system 600. In some embodiments, the UE 140 can be configured as and/or have an architecture that is similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, the processor 112 and/or the processor 131 can be configured substantially similar to the processing unit 602. As such, one or more instances of the processing unit 602 can be implemented within one or more devices and/or components of the operating environment 100, such as but not limited to the audio capture device 124A, the audio capture device 124B, the audio capture device 124N, the control system 130, the digital headend system 150, the network access point 103, the subscribing client 106A, and/or the subscribing client 106N. In some embodiments, the memory 132 can be configured substantially similar to the memory 604. As such, one or more instances of the memory 604 can be implemented within one or more devices and/or components of the operating environment 100, such as but not limited to the audio capture device 124A, the audio capture device 124B, the audio capture device 124N, the control system 130, the digital headend system 150, the network access point 103, the subscribing client 106A, and/or the subscribing client 106N.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. The processing unit 602 can include one or more instances of compute resources, such as but not limited to central processing units ("CPUs") configured with one or more processing cores, one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the processing unit 602 can include one or more system-on-chip ("SoC") components along with one or more other hardware components, including, for example, one or more of memory resources of the memory 604. Processors and processing units also can include state machines, application-specific integrated circuits ("ASICs"), combinations thereof, or the like.

In some embodiments, the processing unit 602 can include one or more instances of hardware components that can in accordance with an ARM architecture that is available for license from ARM HOLDINGS of Cambridge, United Kingdom, an architecture available from INTEL CORPORATION of Mountain View, Calif., an architecture available from QUALCOMM of San Diego, Calif., an architecture available from NVIDIA of Santa Clara, Calif., an architecture available from HUMMINGBIRD, an architecture from SAMSUNG of Seoul, South Korea, an architecture from AMD of Santa Clara, Calif., an architecture from TEXAS INSTRUMENTS of Dallas, Tex., a customized version of any of the above architectures, a proprietary architecture, or any other compute resources. It should be understood that the examples provided are for illustration purposes only, and therefore should not be construed as limiting in any way. Because processors and/or processing units are generally known to one of ordinary skill, the processors and processing units disclosed and discussed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software, program modules, or other computer readable and/or executable instructions that configure hardware resources of the computer system 600, such as but not limited to the processing unit 602 described herein. In some embodiments, for example, the program modules 616 can include audio source isolation service 152, premixer 134, the packetizer 135, the aggregator 136, the control application 133, the media content player the 114, and/or other computer-readable instructions. These and/or other computer-executable instructions can be embodied in computer-readable media containing instructions that, when executed by the processing unit 602, can configure and cause the computer system 600 (or other device) to perform one or more of the operations discussed with respect to the operating environment 100 and/or any of the methods 300, 400, and 430 described in detail above with respect to FIGS. 3, 4A, and 4B. According to some embodiments, the program modules 616 may be embodied in hardware, software, firmware, or any combination thereof. It should be understood that the memory 604 also can be configured to store one or more instance of information and data discussed with respect to FIGS. 1, 2A, 2B, 3, 4A, and 4B, such as but not limited to the audio source selection interface package 180, the assembled media stream 170, the broadcast event profile 128, the protocol profile 137, the custom audio source map 154, the audio source isolation service 152, the custom audio source map 157A, the custom audio source map 157N, the packetized audio data set 140A, the audio isolation tag 142, the packetized audio data set 140B, the audio isolation tag 144, the packetized audio data set 140N, the audio isolation tag 146, and/or other data, if desired, such as but not limited to other instances of data discussed with respect to the operating environment 100.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrases "memory," "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices that can communicate with the computer system 600. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 102. Examples of the network devices 610 include, but are not limited to, a modem, a radio frequency ("RF") or infrared ("IR") transceiver, a telephonic interface, a bridge, a router, or a network card. The network 102 and/or the control network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively (and/or additionally), the network 102 and/or the control network 104 may include a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). It should be understood that the examples provided are for illustration purposes only, and therefore should not be construed as limiting in any way.

Figure 7:
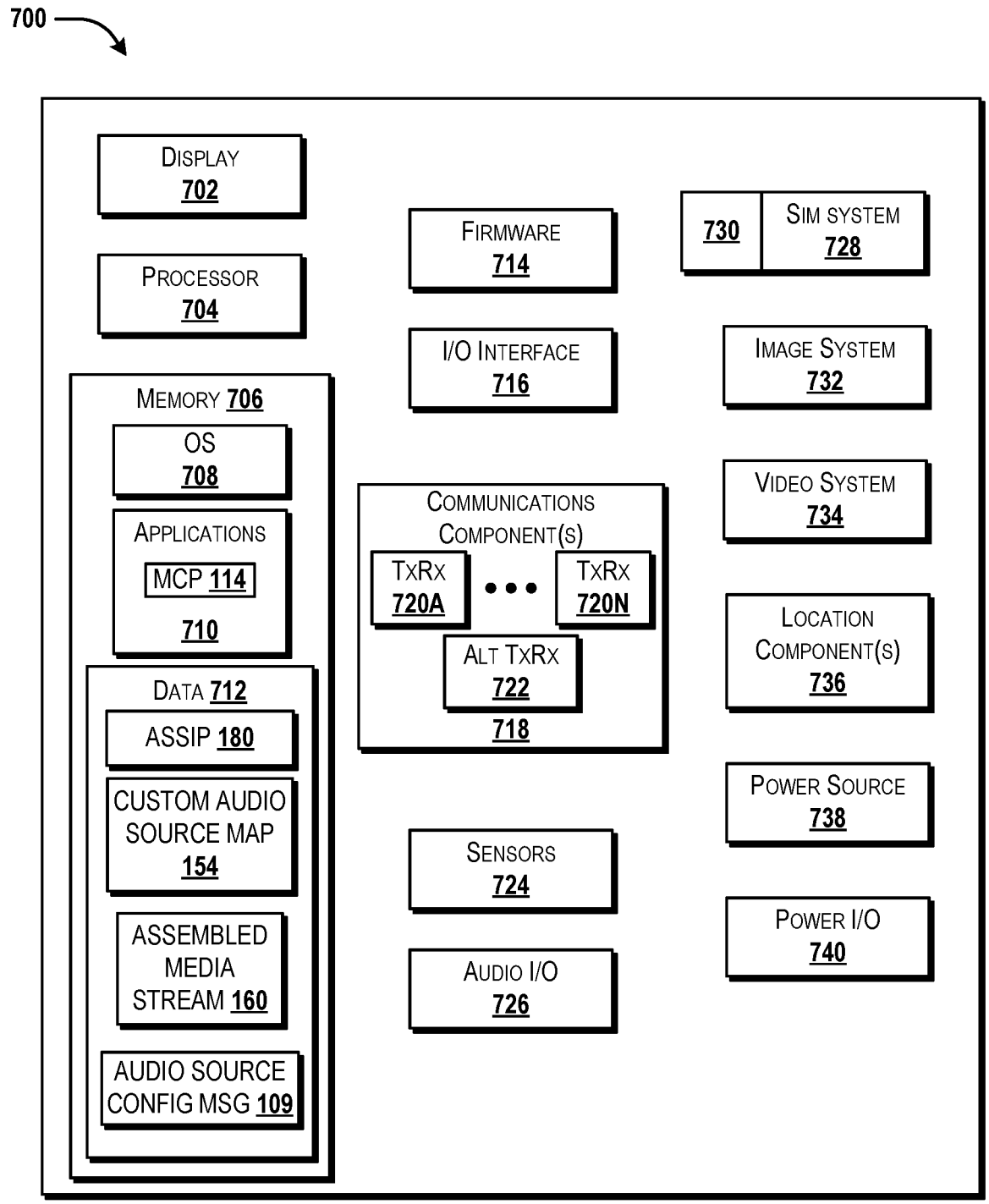
FIG. 7 is a diagram illustrating an example user equipment capable of implementing aspects of the concepts and technologies described herein according embodiments of the present disclosure.

Turning now to FIG. 7, an illustrative user equipment 700 and components thereof will be described. In some embodiments, the UE 110, the subscribing client 106A, the subscribing client 106N, and/or other devices illustrated and described herein can be configured as and/or can have an architecture similar or identical to the user equipment 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the user equipment 700 can include a display 702 for presenting data and information. According to various embodiments, the display 702 can be configured to present various graphical user interface ("GUI") elements for presenting and/or modifying information associated with audiovisual content, an audiovisual content filter, presenting text, images, video, virtual keypads and/or keyboards, messaging data, notification messages, metadata, internet content, device status, time, date, calendar data, device preferences, map and location data, combinations thereof, and/or the like. The user equipment 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the media content player 114, and/or other computer-executable instructions stored in a memory 706, or the like. In some embodiments, the applications 710 also can include a UI application (not illustrated in FIG. 7).

The UI application can interface with the operating system 708 to facilitate any of the operations discussed herein and functionality for presenting audiovisual content and/or data stored at the user equipment 700 and/or stored elsewhere. It is understood that one or more instances of the operating system 708 may be included and operate within one or more systems discussed with respect to the operating environment 100, such as but not limited to the control system 130, the digital headend system 150, the subscribing client 106A, the subscribing client 106N, and/or the UE 110. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in presenting media content (video content and/or audio content), presenting the assembled media stream 170 (including one or more of the packetized audio set streams 170A, 170B, 170N), the audio source selection interface package 180, providing feedback (e.g., the audio source configuration message 109), selecting audiovisual content to view, configuring settings, manipulating address book content and/or settings, multimode interaction, interacting with other applications 710, and otherwise facilitating user interaction with the operating system 708, the applications 710, and/or other types or instances of data 712 that can be stored at the user equipment 700, such as stored by the memory 706. The UI application can execute and provide one or more instances of screen displays discussed herein, such as embodiments of the screen displays 200 and 250 shown in FIGS. 2A and 2B, respectively. According to various embodiments, the data 712 can include, for example, instances of an audio content stream (e.g., the assembled media stream 170 that may include one or more audio streams there, such as the packetized audio set streams 172A, 172B, 172N), the custom audio source maps 154, 157A, 157N, the audio source selection interface package 180, the audio source configuration messages 107A, 107N, 109, any other elements discussed with respect to FIG. 1 and FIGS. 2A-2D, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The user equipment 700 also can include an input/output ("I/O") interface 716. One or more instances of the I/O interface 716 can be included any system and/or device discussed in FIG. 1 (e.g., the control system 130, the digital headend system 150, and/or the UE 110). The I/O interface 716 can be configured to support the input/output of data such as the assembled media stream 170, the audio source selection interface package 180, the audio source configuration message 109, and/or any other information or elements discussed with respect to FIGS. 1, 2A, and 2B, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the user equipment 700 can be configured to synchronize with another device to transfer content to and/or from the user equipment 700. In some embodiments, the user equipment 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the user equipment 700 and a network device or local device.

The user equipment 700 also can include a communications component 718. The communications component 718 can be configured to interface with the processor 704 to facilitate wired and/or wireless communications with one or more networks such as the network 102 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G New Radio, LTE, LTE Advanced, LTE Advance Pro, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The user equipment 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the user equipment 700 may be provided by an audio I/O component 726. The audio I/O component 726 of the user equipment 700 can include one or more speakers for the output of audio signals, one or more microphones for the collection and/or input of audio signals, and/or other audio input and/or output devices. In some embodiments, the audio I/O component 726 may be included as a component of the display 702. For example, in some embodiments, the display 702 can provide and present visual images and/or audio input and/or audio output. In some embodiments, the I/O interface 716 can include direct communicative coupling with the display 702 and/or the audio I/O component 726 so as to provide transfer and input and/or output of visual images (e.g., from the display 702) and/or audio clips (e.g., from the audio I/O component 726) to and/or from the user equipment 700.

The illustrated user equipment 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the user equipment 700 are contemplated, it should be understood that these embodiments are illustrative, and should not be construed as being limiting in any way.

The user equipment 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The user equipment 700 may also include a video system 734. The video system 734 can be configured to capture, process, record, modify, and/or store video content. Photos and videos obtained using the image system 732 and the video system 734, respectively, may be added as message content to an MMS message, email message, and sent to another user equipment. The video and/or photo content also can be shared with other devices via various types of data transfers via wired and/or wireless user equipment as described herein.

The user equipment 700 also can include one or more location components 736. The location components 736 can be configured to send and/or receive signals to determine a geographic location of the user equipment 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the user equipment 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the user equipment 700. Using the location component 736, the user equipment 700 can generate and/or receive data to identify its geographic location, or to transmit data used by other devices to determine the location of the user equipment 700. The location component 736 may include multiple components for determining the location and/or orientation of the user equipment 700.

The illustrated user equipment 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the user equipment 700 can include additional and/or alternative components, the above embodiment should be understood as being illustrative of one possible operating environment for various embodiments of the concepts and technologies described herein. The described embodiment of the user equipment 700 is illustrative, and therefore should not be construed as being limiting in any way.

Based on the foregoing, it should be appreciated that concepts and technologies directed to network broadcasting for selective isolation and presentation of audio content have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
    a processor; and
    a memory that stores computer-executable instructions that, in response to execution by the processor, cause the processor to perform operations comprising:
        obtaining a plurality of raw audio streams created by a plurality of audio capture devices, wherein a first raw audio stream of the plurality of raw audio streams captures audio output from a first audio source related to a media broadcast event and a second raw audio stream of the plurality of raw audio streams captures audio output from a second audio source of the media broadcast event,
        creating a packetized audio data set for the first raw audio stream and a packetized audio data set for the second raw audio stream such that a plurality of packetized audio data sets are created,
        creating a first audio isolation tag for the packetized audio data set of the first raw audio stream and a second audio isolation tag for the packetized audio data set of the second raw audio stream such that execution of each of the plurality of packetized audio data sets can be individually initiated and individually suppressed, wherein each of the first audio isolation tag and the second audio isolation tag comprises a unique undefined protocol value that causes a user equipment to obtain a custom audio source map prior to initiating execution of the packetized audio data set of the first raw audio stream or the packetized audio data set of the second raw audio stream, and
        assigning the first audio isolation tag to the packetized audio data set of the first raw audio stream and assigning the second audio isolation tag to the packetized audio data set of the second raw audio stream.

2. The system of claim 1, wherein the operations further comprise:
    creating an assembled media stream that includes the plurality of packetized audio data sets; and
    providing the assembled media stream to the user equipment.

3. The system of claim 1, wherein the operations further comprise:
    generating a master audio source map comprising an association between the first audio isolation tag and an identifier of the first audio source and an association between the second audio isolation tag and an identifier of the second audio source; and
    providing the master audio source map to a digital head-end system.

4. The system of claim 1, wherein the operations further comprise:
    generating an audio source selection interface package that instructs the user equipment to present an audio source customization interface so as to generate an audio source configuration message and obtain the custom audio source map; and
    providing the audio source selection interface package to the user equipment.

5. The system of claim 1, wherein the operations further comprise receiving an audio source configuration message from the user equipment, wherein the audio source configuration message identifies one or more of the first audio source or the second audio source based on input from a user.

6. The system of claim 5, wherein the operations further comprise:
    generating the custom audio source map for the user equipment based on the audio source configuration message; and
    providing the custom audio source map to the user equipment.

7. The system of claim 6, wherein the custom audio source map configures the user equipment to present the audio output corresponding to the one or more of the first audio source or the second audio source identified in the audio source configuration message.

8. A method comprising:
    obtaining, by a system executing within a network, a plurality of raw audio streams created by a plurality of audio capture devices, wherein a first raw audio stream of the plurality of raw audio streams captures audio output from a first audio source related to a media broadcast event and a second raw audio stream of the plurality of raw audio streams captures audio output from a second audio source of the media broadcast event;
    creating, by the system, a packetized audio data set for the first raw audio stream and a packetized audio data set for the second raw audio stream such that a plurality of packetized audio data sets are created;
    creating, by the system, a first audio isolation tag for the packetized audio data set of the first raw audio stream and a second audio isolation tag for the packetized audio data set of the second raw audio stream such that execution of each of the plurality of packetized audio data sets can be individually initiated and individually suppressed, wherein each of the first audio isolation tag and the second audio isolation tag comprises a unique undefined protocol value that causes a user equipment to obtain a custom audio source map prior to initiating execution of the packetized audio data set of the first raw audio stream or the packetized audio data set of the second raw audio stream; and
    assigning, by the system, the first audio isolation tag to the packetized audio data set of the first raw audio stream and assigning the second audio isolation tag to the packetized audio data set of the second raw audio stream.

9. The method of claim 8, further comprising:
    creating, by the system, an assembled media stream that includes the plurality of packetized audio data sets; and providing, by the system, the assembled media stream to the user equipment.

10. The method of claim 8, further comprising:
generating, by the system, a master audio source map comprising an association between the first audio isolation tag and an identifier of the first audio source and an association between the second audio isolation tag and an identifier of the second audio source; and
providing, by the system, the master audio source map to a digital headend system.

11. The method of claim 8, further comprising:
generating, by the system, an audio source selection interface package that instructs the user equipment to present an audio source customization interface so as to generate an audio source configuration message and obtain the custom audio source map; and
providing, by the system, the audio source selection interface package to the user equipment.

12. The method of claim 8, further comprising receiving, by the system, an audio source configuration message from the user equipment, wherein the audio source configuration message identifies one or more of the first audio source or the second audio source based on input from a user.

13. The method of claim 12, further comprising:
generating, by the system, the custom audio source map for the user equipment based on the audio source configuration message; and
providing the custom audio source map to the user equipment.

14. The method of claim 13, wherein the custom audio source map configures the user equipment to present the audio output corresponding to the one or more of the first audio source or the second audio source identified in the audio source configuration message.

15. A computer storage medium having computer-executable instructions stored thereon that, in response to execution by a processor of a system, cause the processor to perform operations comprising:
obtaining a plurality of raw audio streams created by a plurality of audio capture devices, wherein a first raw audio stream of the plurality of raw audio streams captures audio output from a first audio source related to a media broadcast event and a second raw audio stream of the plurality of raw audio streams captures audio output from a second audio source of the media broadcast event;
creating a packetized audio data set for the first raw audio stream and a packetized audio set for the second raw audio stream such that a plurality of packetized audio data sets are created;
creating a first audio isolation tag for the packetized audio data set of the first raw audio stream and a second audio isolation tag for the packetized audio data set of the second raw audio stream such that execution of each of the plurality of packetized audio data sets can be individually initiated and individually suppressed, wherein each of the first audio isolation tag and the second audio isolation tag comprises a unique undefined protocol value that causes a user equipment to obtain a custom audio source map prior to initiating execution of the packetized audio data set of the first raw audio stream or the packetized audio data set of the second raw audio stream; and
assigning the first audio isolation tag to the packetized audio data set of the first raw audio stream and assigning the second audio isolation tag to the packetized audio data set of the second raw audio stream.

16. The computer storage medium of claim 15, wherein the operations further comprise:
creating an assembled media stream that includes the plurality of packetized audio data sets; and
providing the assembled media stream to the user equipment.

17. The computer storage medium of claim 15, wherein the operations further comprise:
generating a master audio source map comprising an association between the first audio isolation tag and an identifier of the first audio source and an association between the second audio isolation tag and an identifier of the second audio source; and
providing the master audio source map to a digital headend system.

18. The computer storage medium of claim 15, wherein the operations further comprise:
generating an audio source selection interface package that instructs the user equipment to present an audio source customization interface so as to generate an audio source configuration message and obtain the custom audio source map; and
providing the audio source selection interface package to the user equipment.

19. The computer storage medium of claim 15, wherein the operations further comprise receiving an audio source configuration message from the user equipment, wherein the audio source configuration message identifies one or more of the first audio source or the second audio source based on input from a user.

20. The computer storage medium of claim 19, wherein the operations further comprise:
generating the custom audio source map for the user equipment based on the audio source configuration message; and
providing the custom audio source map to the user equipment, wherein the custom audio source map configures the user equipment to present the audio output corresponding to the one or more of the first audio source or the second audio source identified in the audio source configuration message.

* * * * *